US012714280B2

(12) United States Patent
Stuive

(10) Patent No.: US 12,714,280 B2
(45) Date of Patent: Aug. 25, 2026

(54) ACCESSORY TOOL WITH INTEGRAL CLEANOUT ASSEMBLY

(71) Applicant: BISSELL Inc., Grand Rapids, MI (US)

(72) Inventor: Eric J. Stuive, Zeeland, MI (US)

(73) Assignee: Bissell Inc., Grand Rapids, MI (US)

( * ) Notice: Subject to any disclaimer, the term of this patent is extended or adjusted under 35 U.S.C. 154(b) by 307 days.

(21) Appl. No.: 18/491,031

(22) Filed: Oct. 20, 2023

(65) Prior Publication Data

US 2024/0130598 A1 Apr. 25, 2024
US 2024/0225405 A9 Jul. 11, 2024

Related U.S. Application Data

(60) Provisional application No. 63/418,741, filed on Oct. 24, 2022.

(51) Int. Cl.

| | |
|---|---|
| ***A47L 11/30*** | (2006.01) |
| ***A47L 11/34*** | (2006.01) |
| ***A47L 11/40*** | (2006.01) |
| ***B08B 9/035*** | (2006.01) |

(52) U.S. Cl.

CPC ........... *A47L 11/4088* (2013.01); *A47L 11/30* (2013.01); *A47L 11/34* (2013.01); *A47L 11/4016* (2013.01); *A47L 11/4044* (2013.01); *A47L 11/4083* (2013.01); *B08B 9/035* (2013.01); *B08B 2209/032* (2013.01)

(58) Field of Classification Search

CPC ............... A47L 11/201; A47L 11/4088; A47L 11/4094; A47L 11/30; A47L 11/34; A47L 11/4016; A47L 11/4044; A47L 11/4083; A47L 9/248

See application file for complete search history.

(56) References Cited

U.S. PATENT DOCUMENTS

| | | | |
|---|---|---|---|
| 4,074,387 A | 2/1978 | Arato et al. | |
| 4,083,077 A | 4/1978 | Knight et al. | |
| 4,159,554 A | 7/1979 | Knight et al. | |
| 6,453,507 B1 | 9/2002 | Gilbert | |
| 10,188,252 B2 * | 1/2019 | Nguyen | A47L 7/0028 |

(Continued)

FOREIGN PATENT DOCUMENTS

| | | |
|---|---|---|
| CA | 2431445 C | 4/2012 |
| EP | 3016566 B1 | 12/2017 |

(Continued)

*Primary Examiner* — Nathaniel E Wiehe
*Assistant Examiner* — Maxime M Adjagbe
(74) *Attorney, Agent, or Firm* — Price Heneveld LLP

(57) ABSTRACT

An accessory tool for an extraction cleaner having an accessory hose, a fluid delivery system, and a fluid recovery system includes a lens, a tool body, a spray tip, and a cleanout assembly. The tool body is connectable to the fluid delivery system and the fluid recovery system via the accessory hose. The lens couples to the tool body to form a suction nozzle volume therebetween. The tool body defines a fluid channel opposite the lens. The spray tip dispenses a cleaning fluid from the fluid delivery system onto a surface during a spray cycle of the extraction cleaner. The cleanout assembly selectively diverts the cleaning fluid from the spray tip and into the suction nozzle volume via the fluid channel during a clean out cycle of the extraction cleaner to thereby clean the lens and the accessory hose.

19 Claims, 19 Drawing Sheets

(56) References Cited

U.S. PATENT DOCUMENTS

| | | | |
|---|---|---|---|
| 10,548,450 B2 | 2/2020 | Hess et al. | |
| 10,588,476 B2 | 3/2020 | Royale et al. | |
| 2005/0015916 A1 | 1/2005 | Orubor | |
| 2005/0023377 A1 | 2/2005 | Kawamoto | |
| 2017/0127900 A1 | 5/2017 | Wright et al. | |
| 2018/0103817 A1 | 4/2018 | Nadal | |
| 2020/0178749 A1* | 6/2020 | Royale | A47L 11/4091 |

FOREIGN PATENT DOCUMENTS

| | | |
|---|---|---|
| EP | 3466313 A1 | 4/2019 |
| WO | 2022150546 A1 | 7/2022 |
| WO | 2022199272 A1 | 9/2022 |

* cited by examiner

Clean Out Mode

ACCESSORY TOOL WITH INTEGRAL CLEANOUT ASSEMBLY

CROSS-REFERENCE TO RELATED APPLICATION

This application claims priority to and the benefit under 35 U.S.C. § 119(e) of U.S. Provisional Application No. 63/418,741, filed on Oct. 24, 2022, entitled "ACCESSORY TOOL WITH INTEGRAL CLEANOUT ASSEMBLY," the disclosure of which is hereby incorporated herein by reference in its entirety.

TECHNICAL FIELD

The subject disclosure pertains to extraction cleaners having hose-connectable accessory tools. In particular, the subject disclosure pertains to an accessory tool that is connectable to a proximal end of a flexible accessory hose, with a distal end of the flexible accessory hose being connectable to the extraction cleaner.

BACKGROUND

Accessory tools for use with upright and portable extraction cleaners typically include a suction nozzle through which liquid and entrained debris are extracted from a surface during an extraction cleaning process. For example, common household extraction cleaning tasks can often be performed using a suitable cleaning fluid, e.g., water or a liquid cleaning solution containing surfactants, stabilizers, fragrances, and other active and inactive ingredients. Fluid-based or "wet" extraction cleaners include a housing that carries separate fluid delivery and fluid recovery systems. The fluid delivery system directs the cleaning fluid to the surface to be cleaned, while the fluid recovery system extracts spent cleaning fluid and entrained debris from the surface and deposits it in a recovery tank for disposal.

Within the fluid delivery system, the cleaning fluid is dispensed from the fluid supply tank. The cleaning fluid passes through a fluid supply conduit carried by a flexible accessory hose and is eventually distributed onto the particular surface to be cleaned, e.g., through one or more orifices of the accessory tool or using a spray nozzle. The dispensed cleaning fluid can be agitated using a brush or needles arranged on a working surface of the accessory tool to help loosen and capture embedded dirt, pet dander, and other debris. A suction source located aboard the extraction cleaner generates the above-described suction forces to extract spent cleaning fluid and entrained debris from the surface.

BRIEF SUMMARY

An accessory tool is disclosed herein for use with an extraction cleaner having separate fluid delivery and recovery systems. Also disclosed herein are extraction cleaners equipped with such an accessory tool, as well as related methods for cleaning out the accessory tool and a connected accessory hose. Overtime, fluid-based extraction cleaning processes can result in an accumulation of debris within the accessory tool and a flexible accessory hose connected thereto. As accessory tools can be equipped with a transparent or translucent outer lens, the accumulated debris may be visible to a user through the material of the lens, and may also emit unpleasant odors. It is therefore desirable to periodically remove the accumulated debris from the accessory tool and the accessory hose.

An aspect of the present disclosure includes an accessory tool for an extraction cleaner having an accessory hose, a fluid delivery system, and a fluid recovery system. The accessory tool in one or more configurations includes a lens, a tool body, a spray tip, and a cleanout assembly. The tool body is connectable to the fluid delivery system and the fluid recovery system via the accessory hose. The lens is coupled with the tool body, e.g., connected to or formed integrally therewith, so as to form a suction nozzle volume. The tool body defines a fluid channel opposite the lens that is in fluid communication with the suction nozzle volume. The spray tip is configured to dispense a cleaning fluid from the fluid delivery system onto a surface to be cleaned during a "spray" mode of the extraction cleaner. The cleanout assembly is connected to the tool body and configured to selectively divert the cleaning fluid from the spray tip and into the fluid channel during a "clean out" mode of the extraction cleaner to thereby clean the lens and the accessory hose.

The accessory tool in accordance with another configuration includes a lens, a tool body, a spray tip, a cleanout assembly, and first and second actuators. The tool body is connectable to the fluid delivery system and the fluid recovery system via the accessory hose. The lens and the tool body together form a suction nozzle volume. The spray tip is configured to dispense a cleaning fluid from the fluid delivery system during a "spray" mode of the extraction cleaner. The cleanout assembly in turn is configured to selectively divert the cleaning fluid from the spray tip and into the suction nozzle volume to thereby clean the lens and the accessory hose during a "clean out" mode of the extraction cleaner. The cleanout assembly in this representative configuration includes a diverter sleeve and a rinse tip, with the rinse tip conducting the cleaning fluid into the suction nozzle volume during the "clean out" mode. The second actuator is connected to the tool body. The first actuator is configured to dispense the cleaning fluid from the fluid delivery system to the spray nozzle during the "spray" mode. The second actuator is also connected to the diverter sleeve and configured to translate over the spray tip to selectively divert the cleaning fluid from the spray tip during the "clean out" mode.

An extraction cleaner is also disclosed herein, a configuration of which includes an accessory hose, a fluid delivery system, a fluid recovery system, and an accessory tool. The accessory tool may include a lens and a tool body, with the tool body being connectable to the fluid delivery system and the fluid recovery system via the accessory hose. The lens and the tool body together form a suction nozzle volume, with the tool body including a rear tool wall that defines a transverse fluid channel. The transverse fluid channel is arranged parallel and adjacent to a nozzle opening of the suction nozzle volume.

As part of this non-limiting exemplary configuration of the extraction cleaner, a spray tip of the accessory tool is configured to dispense a cleaning fluid from the fluid delivery system onto a surface to be cleaned during a "spray" mode of the extraction cleaner. A cleanout assembly selectively diverts the cleaning fluid from the spray tip and into the suction nozzle volume via the transverse fluid channel during a "clean out" mode of the extraction cleaner to thereby clean the lens and the accessory hose.

The above summary is not intended to represent every possible construction or aspect of the subject disclosure. Rather, the foregoing summary is intended to exemplify some of the novel aspects and features disclosed herein. The above-summarized features and other features and advantages of the subject disclosure will be readily apparent from the following detailed description of representative examples and modes for carrying out the subject disclosure when taken in connection with the accompanying drawings and the appended claims.

BRIEF DESCRIPTION OF THE DRAWINGS

The drawings described herein are for illustrative purposes only, are schematic in nature, and are intended to be exemplary rather than to limit the scope of the disclosure.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The subject disclosure may be embodied in many different forms. Representative examples are shown in the various drawings and described in detail below, with the understanding that the descriptions are exemplifications of the disclosed principles and not limitations of the broad aspects of the disclosure. To that end, elements and limitations described below, but not explicitly set forth in the claims, should not be incorporated into the claims, singly or collectively, by implication, inference, or otherwise. Moreover, the drawings discussed herein may not be to scale, and are provided purely for instructional purposes. Thus, the specific and relative dimensions shown in the Figures are not to be construed as limiting.

Additionally, unless specifically disclaimed: the singular includes the plural and vice versa; the words "and" and "or" shall be both conjunctive and disjunctive; the words "any" and "all" shall both mean "any and all"; and the words "including," "containing," "comprising," "having," along with permutations thereof and similar terms, shall each mean "including without limitation." Further, the words "example" or "exemplary" are used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example.

Figure 1:
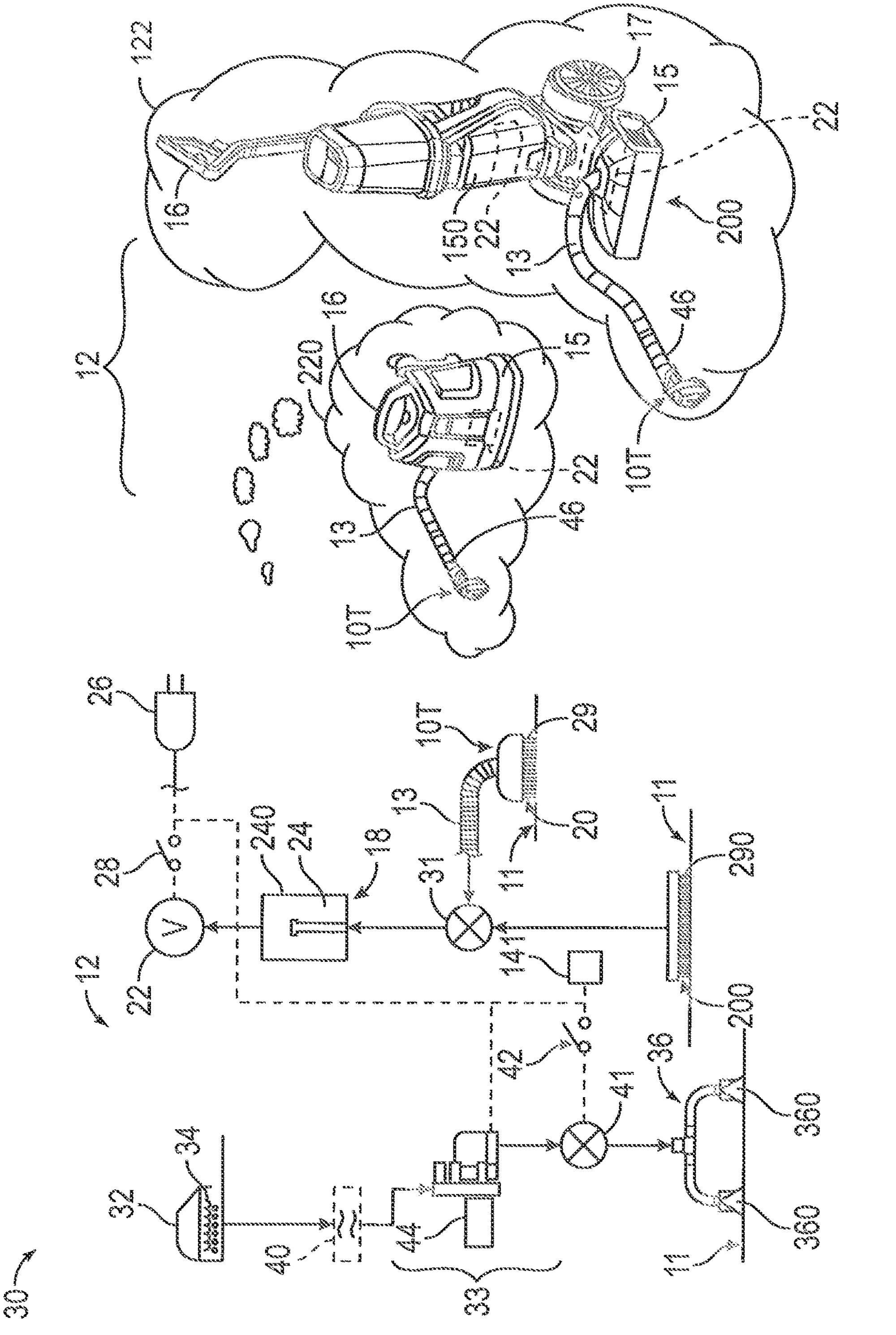
FIG. 1 is a schematic view of a fluid circuit for extraction cleaners having a hose-connectable accessory tool equipped with a cleanout assembly constructed, according to the present disclosure.

For purposes of description herein, the terms "upper," "lower," "right," "left," "rear," "front," "vertical," "horizontal," and derivatives thereof, shall relate to the disclosure as oriented in FIG. 1. Unless stated otherwise, the term "front" shall refer to a surface closest to an intended viewer, and the term "rear" shall refer to a surface furthest from the intended viewer. However, it is to be understood that the disclosure may assume various alternative orientations, except where expressly specified to the contrary. It is also to be understood that the specific structures and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

As summarized above, it is desirable to prevent an accumulation of debris within an accessory tool and a flexible accessory hose of an upright or portable extraction cleaner. Such extraction cleaners are typically equipped to receive the accessory hose, with an opposing end of the accessory hose being connectable to the accessory tool via a fluid conduit piece or "wand". The accessory tool thus serves as a hand-maneuverable suction tool suitable for cleaning a surface (e.g., floors, stairs, furniture, drapes, etc.). The hardware solutions described in detail below are intended to help a user selectively remove accumulated debris from the accessory tool and the accessory hose in a user-friendly manner relative to traditional hose cleaning devices.

Referring to the drawings, wherein like reference numbers refer to the same or like components in the several Figures, and beginning with FIG. 1, an accessory toot 10T configured as set forth in detail herein is usable with an extraction cleaner 12, with the extraction cleaner 12 exemplified as an upright extraction cleaner 122 and a portable extraction cleaner 220. Representative configurations can be found in U.S. Pat. No. 8,707,510 to Reed, Jr., U.S. Pat. No. 8,991,000 Huffman et al., and U.S. Pat. No. 9,867,517 to Krebs et al., all which are hereby incorporated by reference in their respective entireties.

The accessory tool 10T is selectively connectable to the extraction cleaner 12 via a flexible accessory hose 13 and a wand 46 (also see FIG. 2), which is a conduit section serving as an intervening attachment piece for coupling the accessory tool 10T to the accessory hose 13. As summarized above, an interior of the accessory tool 10T and an interior of the accessory hose 13, over time and with extensive usage, can become coated with dirt, pet dander, hair, and other debris, with the accumulated debris in turn often emitting unpleasant odors. Additionally, an accumulation within the accessory tool 10T can obscure a user's view of the cleaning process. The present disclosure is therefore directed to tool-integrated solutions for removing accumulated debris in a user-friendly and time-efficient manner, with exemplary constructions of the accessory tool 10T described in detail below.

The extraction cleaner 12 depicted in FIG. 1 as contemplated herein includes a fluid recovery system 18 having a suction source (V) 22 for cleaning a surface 11 (e.g., carpeting, rugs, upholstery, drapes, etc.) and a fluid delivery system 30 for supplying an application-suitable cleaning fluid to the surface 11. The accessory tool 10T within the scope of the present disclosure is selectively connectable to the extraction cleaner 12 via a flexible length of the accessory hose 13 to allow a user to position and maneuver the accessory tool 10T as desired during an extraction cleaning process. As part of this process, a diverter valve 31 or an accessory hose port of the fluid recovery system 18 may be used to fluidly connect the suction source 22 to a suction nozzle 200 of the extraction cleaner 12 (e.g., the upright extraction cleaner 122) or to a suction nozzle 20 of the accessory tool 10T.

The extraction cleaner 12 in its various configurations may include a housing 15 and a handle 16 coupled or formed integrally therewith. The handle 16 of the portable extraction cleaner 220 in particular facilitates unit portability by allowing a user to lift and carry the portable extraction cleaner 220. The upright extraction cleaner 122 for its part, of which the housing 15 acts as a lower housing that is pivotably coupled or connected to an upper housing 150, may be coupled to a set of wheels 17 or another suitable surface drive mechanism to enable a user to roll the upright extraction cleaner 122 along the surface 11. The fluid recovery system 18 carried by the housing 15 is in fluid communication with the suction nozzles 20 and 200, with the suction nozzle 20 being an integral component of the accessory tool 10T.

The fluid recovery system 18 shown schematically in FIG. 1 includes the suction source 22, such as a motorized fan assembly, which in turn is in fluid communication with the suction nozzles 20, 200 and operable for generating a working airstream or airflow. Additionally, the fluid recovery system 18 can include a separator 24 formed in a portion of the recovery tank 240 for separating fluid and entrained debris from the working airstream.

The suction source 22 of FIG. 1 can be electrically coupled to a power source 26 (schematically represented as a power plug connectable thereto), such as a battery or by a power cord plugged into a household electrical outlet. A power switch 28 disposed between the suction source 22 and the power source 26 can be selectively closed by a user (e.g., upon pressing a vacuum power button), thereby activating the suction source 22 as needed or desired. Optionally, an agitator 29 can be provided adjacent to the suction nozzle 20 of the accessory tool 10T, and/or an agitator 290 can be provided adjacent to the suction nozzle 200 of the extraction cleaner 12 for agitating fluid and debris when cleaning the surface 11. Non-limiting examples of the agitators 29, 290 include polymeric bristles, bristle strips, tufts, brushes, needles, other projections, a rubber squeegee surface, and/or nub protrusions to help remove pet hair from upholstery during cleaning.

The fluid delivery system 30 is also shown schematically in FIG. 1. The fluid delivery system 30 can include one or more fluid supply tanks 32 for storing a volume of a liquid cleaning fluid 34. For instance, common household extraction cleaning tasks can often be performed using water or a water-based cleaning solution containing surfactants, stabilizers, fragrances, and other active and inactive ingredients. The cleaning fluid 34 therefore can be any application-suitable treating agent(s) or mixtures thereof. An optional heater 40 can be used for heating the cleaning fluid 34 prior to delivering the cleaning fluid 34 to the surface 11. By way of example, an in-line heater variant of the heater 40 could be located downstream of the fluid supply tank(s) 32 and upstream of a fluid pump 44 as shown. Other types of heaters 40 can be used within the scope of the disclosure, such as heating via exhaust from the suction source 22.

The fluid delivery system 30 depicted schematically in FIG. 1 also includes a fluid dispenser 36 for dispensing the cleaning fluid 34 onto the surface 11 as part of the normal floor cleaning operation of the extraction cleaner 12, in this instance the upright extraction cleaner 122. Although a single supply tank 32 is shown, those skilled in the art will appreciate that additional supply tanks 32 could be used without departing from teachings herein. For instance, one of the supply tanks 32 could store clean water, and one or more additional supply tanks 32 could store a detergent-based cleaning solution. Outlet flow from the different supply tanks 32 in such a construction could be mixed using a mixing valve or other suitable approaches to control a composition of the fluid ultimately dispensed to the surface 11.

The fluid delivery system 30 of FIG. 1 can also include a flow control system 33. In a possible construction, the flow control system 33 includes the above-noted fluid pump 44 (e.g., a centrifugal or solenoid pump) which is operable for pressurizing the fluid delivery system 30 to force the cleaning fluid 34 through a liquid supply conduit and ultimately out of the fluid dispenser 36 (e.g., through one or more spray tips 360). A flow control valve 41 and an actuator 141 may be used to control this process.

For instance, the flow control valve 41 could be actuated via the actuator 141 via an electrical switch 42 disposed between the flow control valve 41 and the power source 26. The electrical switch 42 can be selectively closed when the actuator 141 is activated, thereby powering the flow control valve 41 to an open position and thus allowing the cleaning fluid 34 to be dispensed. The accessory hose 13 is likewise coupled to the flow control valve 41 when the accessory hose 13 is connected to the extraction cleaner 12 such that the fluid delivery process described above temporarily diverts the cleaning fluid 34 to the surface 11 through the accessory tool 10T, as will now be described with reference to the remaining Figures.

Figure 2:
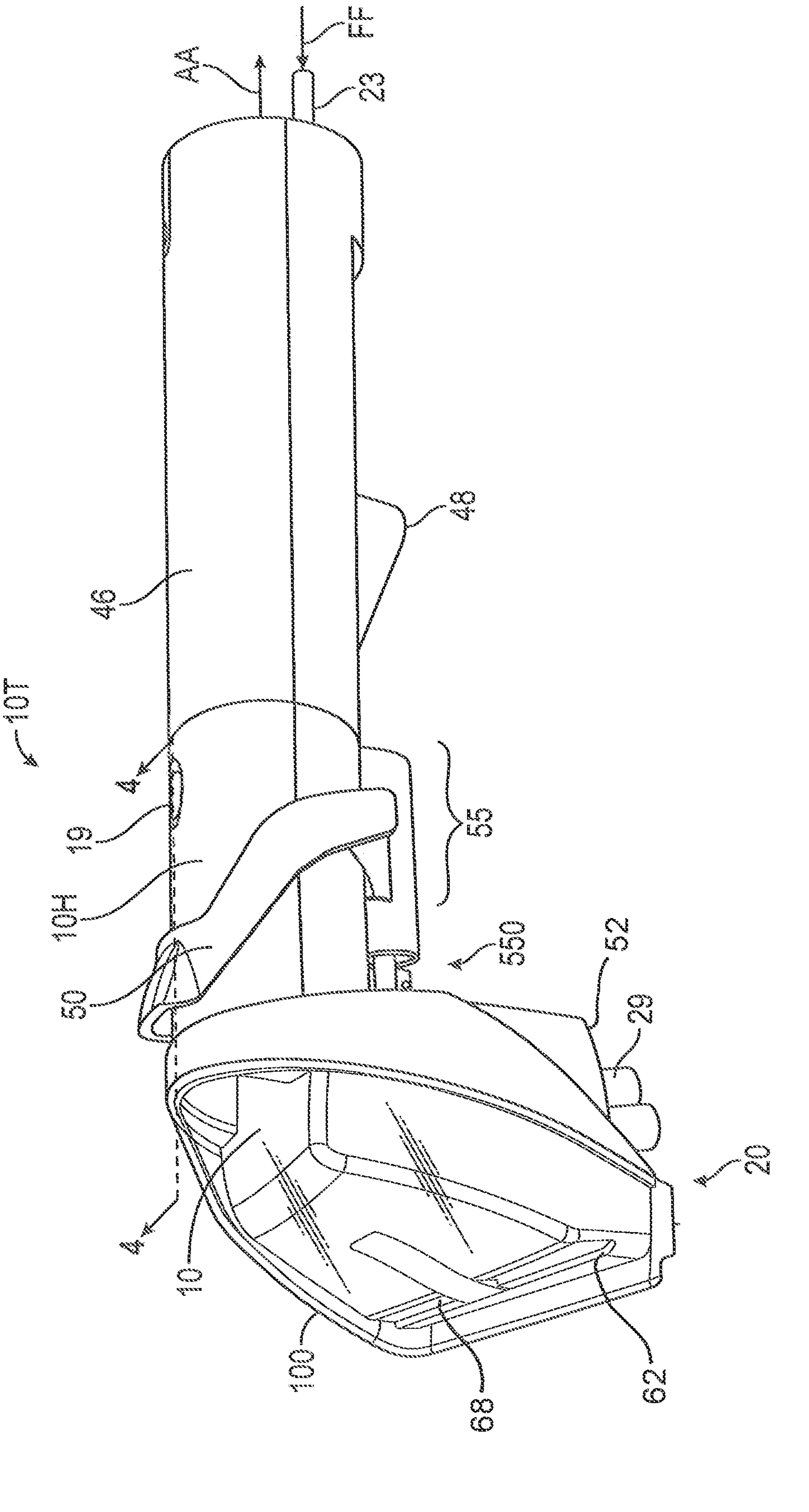
FIG. 2 is a side perspective view of a representative configuration of an accessory tool equipped with a cleanout assembly, according to the present disclosure.

Referring to FIG. 2, the accessory tool 10T is shown coupled to the wand 46. A cut line 4-4 is shown through a longitudinal centerline of the accessory tool 10T, with the cut line 4-4 used below to establish the cross-sectional views of FIGS. 5 and 6. The accessory tool 10T as contemplated herein includes a tool body 10 connected to a tubular handle 10H. The handle 10H in turn includes a latch feature or mechanism 19 for securing the handle 10H of the accessory tool 10T to the wand 46. During an extraction cleaning process of the surface 11 performed using the accessory tool 10T (i.e., when the accessory tool 10T is securely attached to the extraction cleaner 12 of FIG. 1 via the accessory hose 13), the cleaning fluid 34 of FIG. 1 enters the accessory tool 10T as indicted by arrow FF through a feed hose 23. This occurs as airflow (indicated by arrow AA) generated by applied suction forces from the suction source 22, and possible entrained fluid and debris, passes in the opposite direction toward the extraction cleaner 12 for storage and disposal. When the accessory tool 10T is securely connected to the wand 46, and when the wand 46 is securely connected to the accessory hose 13, a user manipulating the accessory tool 10T can more easily maneuver the accessory tool 10T to reach the surface 11 when cleaning stairs, the corners of a room, behind furniture, or when cleaning upholstery or drapes to name a few exemplary uses.

During ongoing use of the accessory tool 10T, the user is able to control delivery of the cleaning fluid 34 to the surface 11 by using a first actuator 48, which may be referred to as a spray actuator 48, disposed on the wand 46. For example, the first actuator 48 could be constructed as a spray trigger as shown, which when depressed or otherwise activated has the effect of admitting the cleaning fluid 34 into a spray nozzle 55 and through a spray tip 550 to implement a "spray" mode of operation. The optional agitators 29, for example, rubber or polymeric brushes, cones, needles, bristles, etc., may be disposed on a working surface 52 of the accessory tool 10T and as appreciated in the art may be used to scrub stubborn stains and help lift dirt and entrained debris from the surface 11.

Temporary and selective diversion or redirection of the cleaning fluid 34 around or bypassing the spray tip 550 for the purpose of cleaning out the accessory tool 10T and the accessory hose 13 is also provided herein by a second actuator 50, which may also be referred to as a tool actuator 50, coupled to the accessory tool 10T. The second actuator 50 may be an actuatable or slidable lever feature or mechanism as shown. In the illustrated configuration, a user urges the second actuator 50 toward the tool body 10 (away from the wand 46) to perform the "spray" mode. However, those skilled in the art will appreciate that the second actuator 50 could have additional or alternative configurations such as a similar actuatable lever that is urged toward the wand 46 instead of the tool body 10 when performing the "spray" mode.

Figure 3:
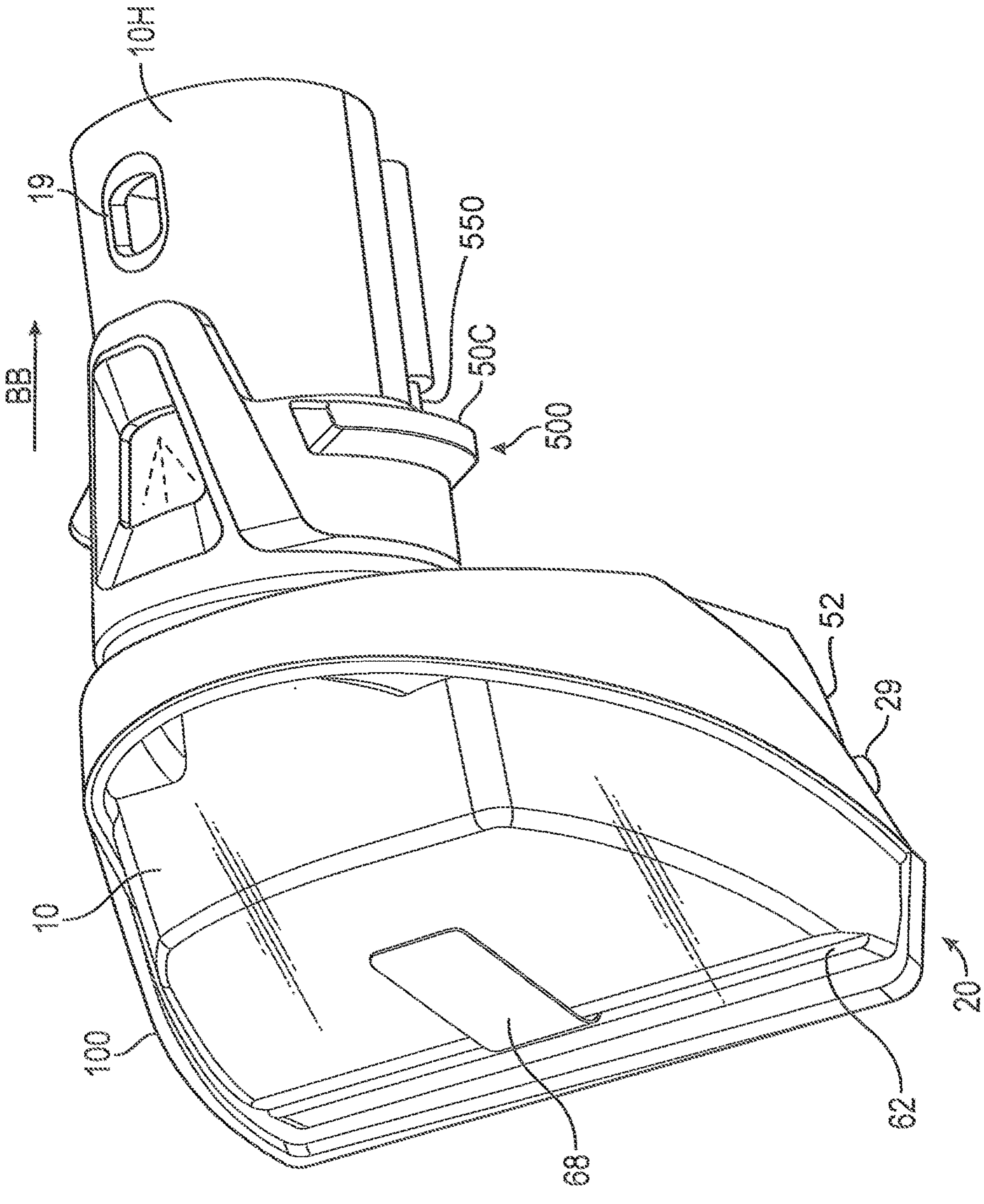
FIG. 3 is a side perspective view of an alternative configuration of an accessory tool, according to the present disclosure.

Additional configurations of the second actuator 50 may be contemplated within the scope of the present disclosure. For instance, an alternative second actuator 500 as shown in FIG. 3 may include a sliding collar 50C. In such examples, a user could translate the sliding collar 50C toward the handle 10H (in a direction indicated by arrow BB) or away from the handle 10H (opposite the direction indicated by arrow BB) to alternatively bypass and block the spray tip 550. Thus, the second actuator 50 can be any type of moveable, pivotable, rotatable, and/or slidable actuator that is coupled with the diverter sleeve 66 for corresponding movement with a diverter sleeve 66, as described in detail herein and with particular reference to FIGS. 4-7. Such a diverter sleeve 66 can be disposed behind the spray tip 550 and moveable or slidable forward during the "clean out" mode, or the diverter sleeve 66 can be disposed forward of the spray tip 550 and moveable or slidable rearward during the "clean out" mode in possible constructions. Delivery of the cleaning fluid 34 during such a mode, as described in detail below, is facilitated by a rinse tip 68 and a transverse fluid channel 62.

To assist a user in viewing the ongoing cleaning process, the tool body 10 of FIGS. 2 and 3 can be constructed at least partially from a transparent or translucent material such as plastic (e.g., polypropylene or polyethylene). For instance, the tool body 10 may be coupled to, attached to, or formed integrally with a lens 100, through which the user is able to view the extracted cleaning fluid 34 and debris being suctioned away from the surface 11. The accessory tool 10T also includes the suction nozzle 20 described above with reference to FIG. 1, with the suction nozzle 20 being disposed adjacent to the working surface 52 of the tool body 10 and proximate to the optional agitators 29. Various locations, shapes, and sizes of the suction nozzle 20 are possible in different configurations, with a typical construction being a relatively thin slot-like opening optimized for generating a vacuum or suction effect and lifting fluids and debris from the surface 11, as appreciated in the art.

Figure 4:
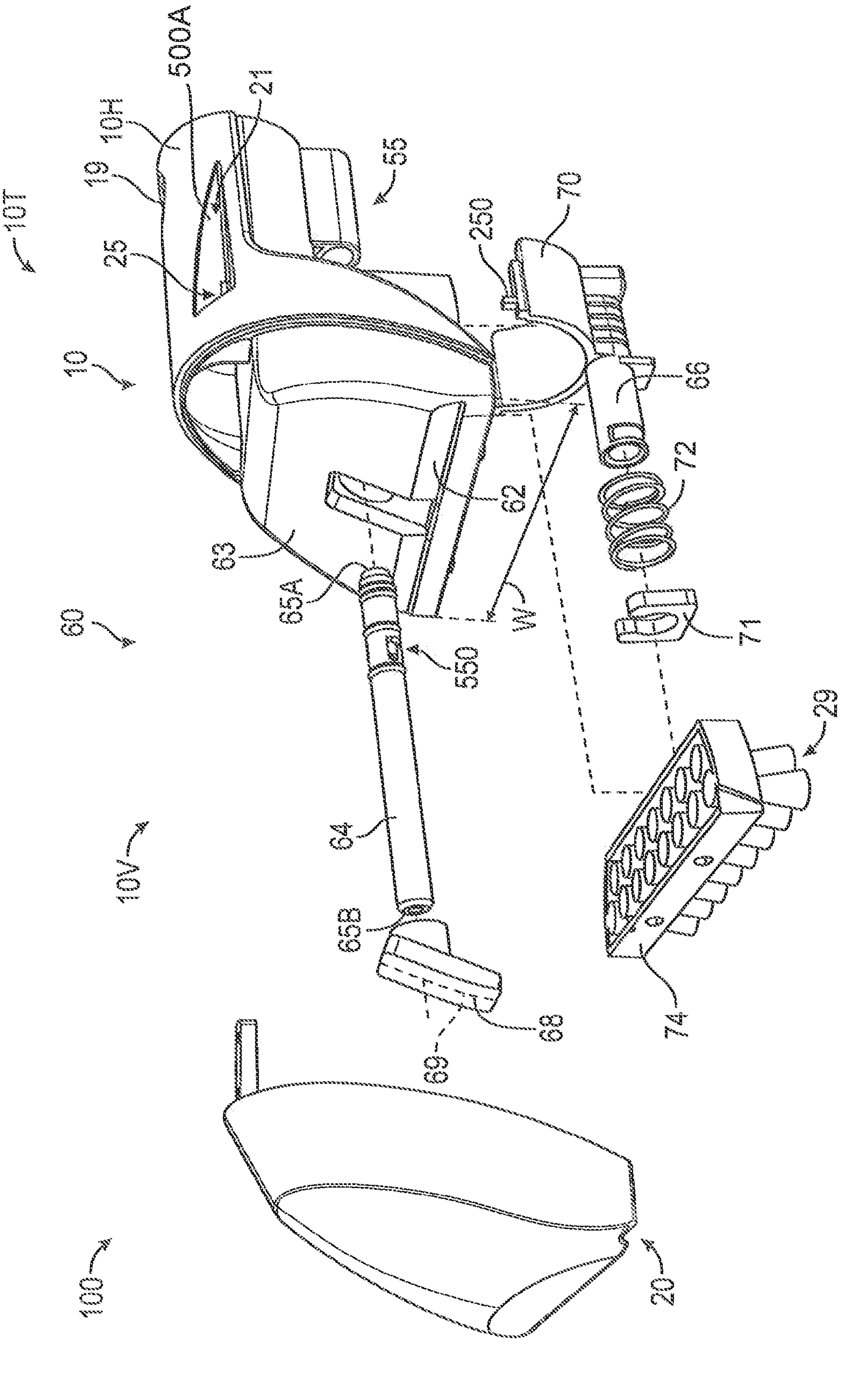
FIG. 4 is an exploded side perspective view of an alternative representative accessory tool, according to the present disclosure.

Referring now to FIG. 4, the accessory tool 10T in another representative configuration includes the lens 100, the tool body 10, the spray nozzle 55 having the spray tip 550, and a cleanout assembly 60. The tubular handle 10H of the tool body 10 is connectable to the fluid delivery system 30 and the fluid recovery system 18 via the wand 46 (FIG. 2) and the accessory hose 13 (FIG. 1) as noted above. The lens 100 in turn is connectable to the tool body 10 to form a suction nozzle volume 10V therebetween, which is viewable via the lens 100, and with the tool body 10 defining the transverse fluid channel 62 opposite the lens 100 and in fluid communication with the suction nozzle volume 10V. The transverse fluid channel 62 is on an opposing surface of the suction nozzle volume 10V relative to an inner surface of the lens 100. As used herein, "transverse" refers to a general direction of the transverse fluid channel 62 relative to a width (W) of the accessory tool 10T and lens 100 (i.e., arranged across the width (W) of the accessory tool 10T and the lens 100).

The spray tip 550 is configured to dispense the cleaning fluid 34 from the fluid delivery system 30 onto the surface

Figure 5:
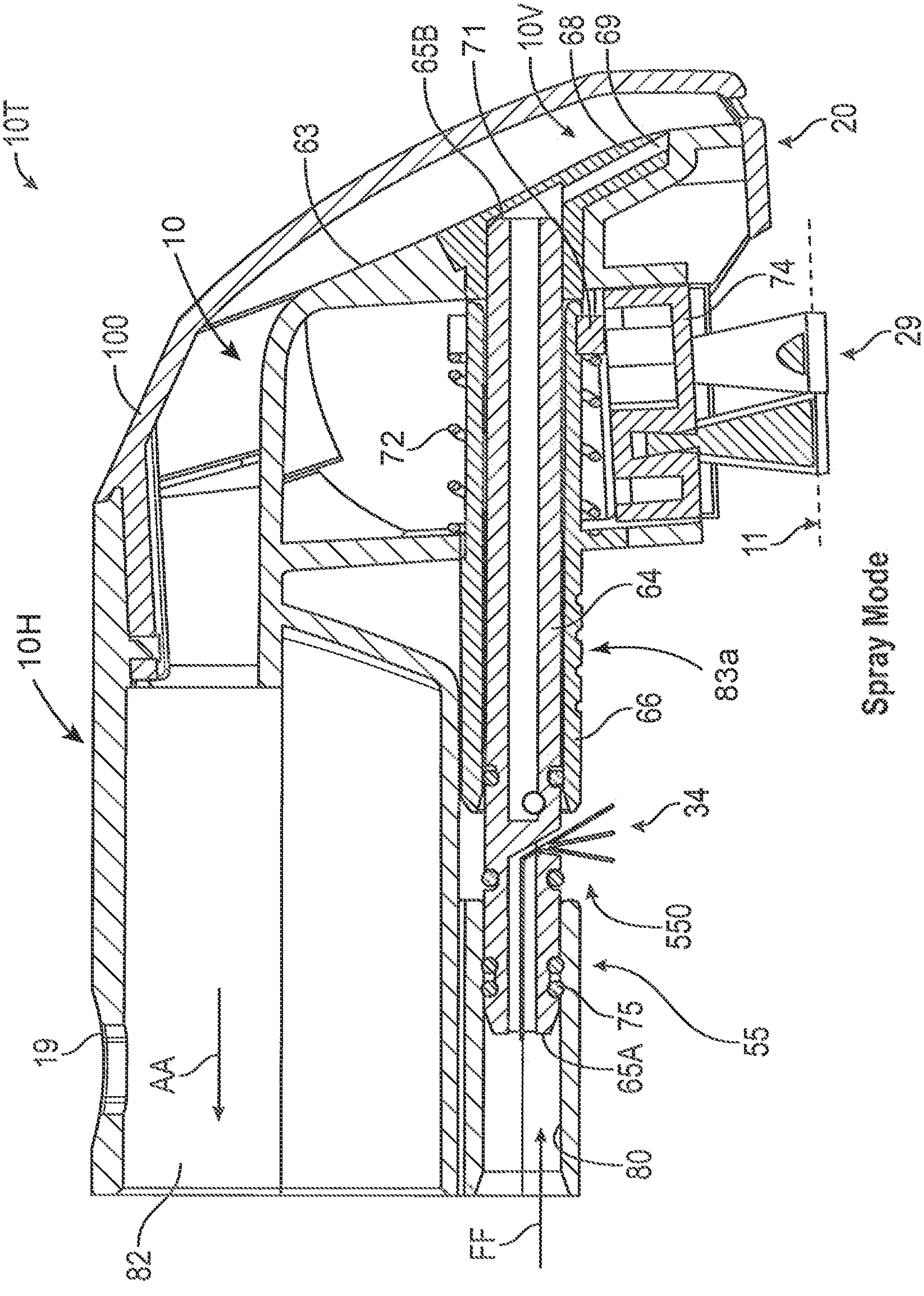
FIG. 5 is a side cross-sectional view of the accessory tool of FIG. 2 along lines 4-4 depicting a "spray" mode, according to the present disclosure.
Figure 6:
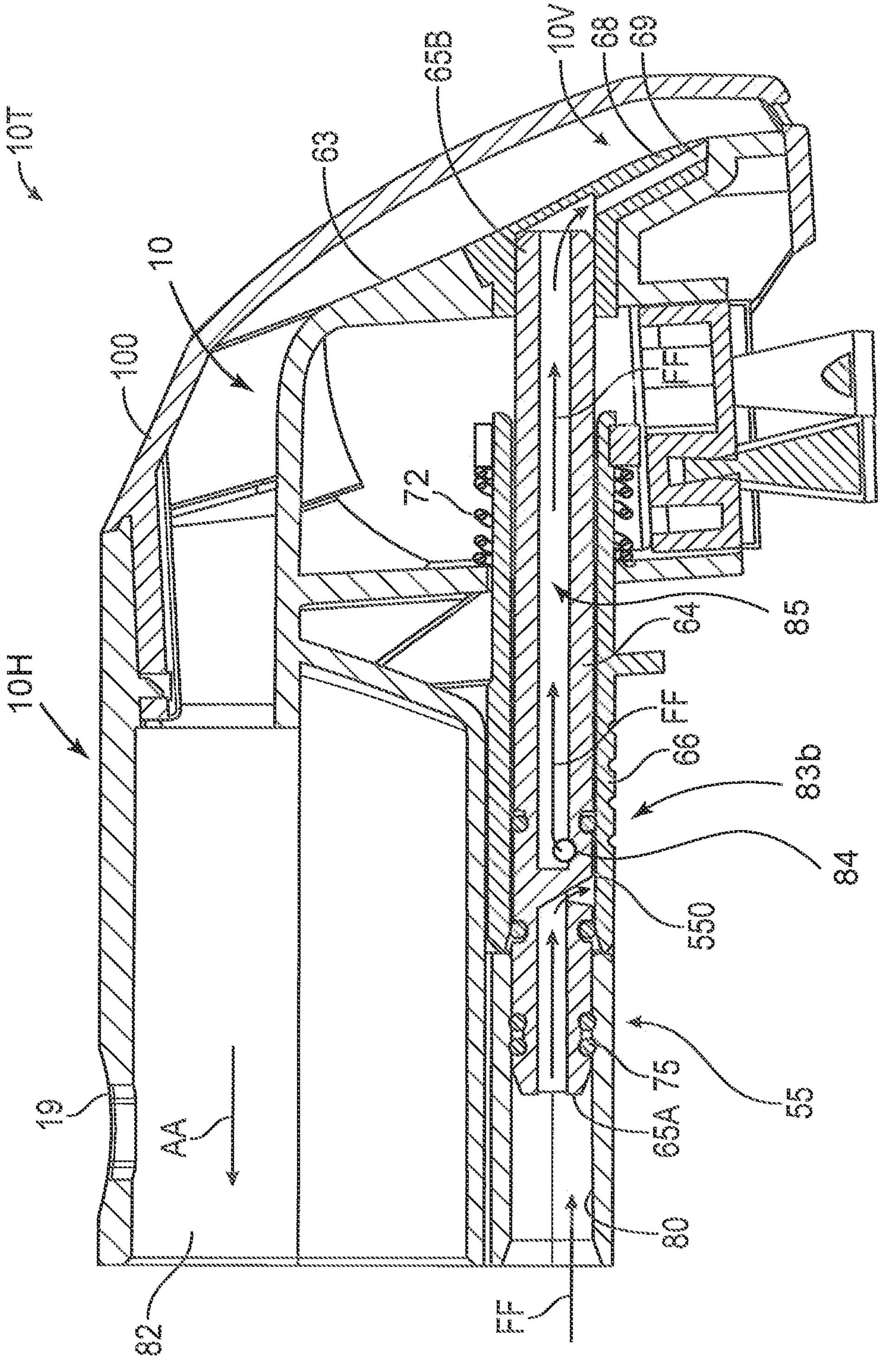
FIG. 6 is a side cross-sectional view of the accessory tool of FIG. 2 along lines 4-4 depicting a "clean out" mode, according to the present disclosure.

11 of FIG. 1 during the aforementioned "spray" mode. The cleanout assembly 60, shown in detail in FIGS. 5 and 6, is coupled to the tool body 10 and configured to selectively divert or redirect the cleaning fluid 34 around or from the spray tip 550, into the transverse fluid channel 62, and ultimately into the suction nozzle volume 10*y* during the "clean out" mode to thereby flush debris from the lens 100, the tool body 10, and the accessory hose 13.

The tool body 10 of FIG. 4 includes a rear tool wall 63 positioned opposite the lens 100 to define the suction nozzle volume 10V. In the configurations described below, the rear tool wall 63, which may be angled/sloped as shown or vertical, partially defines the transverse fluid channel 62, which in turn is arranged parallel to and adjacent to the suction nozzle 20 forming an inlet or a nozzle opening to the suction nozzle volume 10*y*. The cleanout assembly 60 as contemplated herein also includes a sprayer tube 64 having the aforementioned spray tip 550, which may be a cylindrical piece of plastic or metal with opposing first and second ends 65A, 65B, respectively. During the contemplated "spray" mode, the cleaning fluid 34 passing into the accessory tool 10T enters the sprayer tube 64 through its end 65A and is dispensed onto the surface 11 through the spray tip 550, forward of the spray nozzle 55, by action of the first actuator 48 (FIG. 2).

During the "clean out" mode, the diverter sleeve 66 (also see FIGS. 5 and 6) translates or slides over the sprayer tube 64 and the spray tip 550, thereby blocking the spray tip 550. In the non-limiting construction of FIG. 4, a second actuator 500A is used for this purpose in which a first tab 25 disposed within a recess 21 on the handle 10H engages the diverter sleeve 66 via a second tab 250, with the first tab 25 being translated by the user to move the diverter sleeve 66. The accessory tool 10T of FIG. 4, however, may be equipped with an alternative second actuator (e.g., the second actuator 50 or 500 described above) within the scope of the present disclosure.

To assist in the desired action, the diverter sleeve 66 in the representative example of FIG. 4 may be connected to the tool body 10 via a trigger sleeve 70, a spring clip 71, and a coil spring 72, or using other suitable attachment and biasing features. In the illustrated examples, the optional agitators 29 noted above are connected to or integral with a brush plate 74 and securely connected or bonded to the tool body 10 (see FIG. 2), with other variations of the accessory tool 10T possibly omitting the agitators 29 or using different configurations thereof.

Referring still to FIG. 4, the cleanout assembly 60 can also include the rinse tip 68. The rinse tip 68 is configured to direct or conduct the cleaning fluid 34 toward and into the transverse fluid channel 62 during the "clean out" mode in the illustrated construction. As will be described below, the rinse tip 68 defines or is connected to a downward fluid passage 69 that intersects the transverse fluid channel 62, such that the cleaning fluid 34 fed through the sprayer tube 64 ultimately exits the second end 65B of the sprayer tube 64, enters the fluid passage 69, and passes into the transverse fluid channel 62. As will also be described below with reference to FIGS. 8-12, the transverse fluid channel 62 in particular is configured to create low-pressure zones within the suction nozzle volume 10V to help distribute the cleaning fluid 34 across the width (W) of the lens 100 when the fluid recovery system 18 applies a suction force to the suction nozzle volume 10V.

FIGS. 5 and 6 are cross-sectional views of the accessory tool 10T taken along cut line 4-4 of FIG. 2, with actuation via any of the aforementioned approaches, including that of FIG. 4. As shown, the tool body 10 and the handle 10H contains or defines a fluid delivery pathway 80 and an airflow pathway 82. The fluid delivery pathway 80 is configured to connect to the fluid delivery system 30 via the wand 46 and accessory hose 13, while the airflow pathway 82 is configured to connect to the fluid recovery system 18, likewise via the wand 46 and the accessory hose 13. Thus, the fluid delivery pathway 80 carries the cleaning fluid 34 (arrow FF) and the airflow pathway 82 carries the airflow (arrow AA). The spray tip 550 is in fluid communication with the fluid delivery pathway 80, with the cleaning fluid 34 ultimately passing through and out of the spray tip 550 or bypassing or being redirected from the spray tip 550 depending on the operating mode, of which there are at least two: (1) the "spray" mode (FIG. 5), and (2) the "clean out" mode (FIG. 6). Each operating mode will now be described in further detail.

SPRAY MODE: In the "spray" mode performed using the non-limiting example of FIG. 5, a user depresses or otherwise activates the first actuator 48 shown in FIG. 2. During this mode, the cleaning fluid 34 travels through the fluid delivery pathway 80 and into the first end 65A of the sprayer tube 64, an outer diameter of which may be fluidly sealed via multiple O-rings 75 or seals. The cleaning fluid 34 exits the spray tip 550 and is dispensed onto the surface 11. The diverter sleeve 66 is in a spray position 83*a*, or an open position 83*a*, that allows the cleaning fluid 34 to exit the spray tip 550 and be directed to the surface 11.

While the spray tip 550 is shown as an orifice in FIG. 5, those skilled in the art will appreciate that various nozzles may be attached to the spray tip 550 to provide a desired or selectable fluid distribution pattern or direction. Agitation of the dispensed cleaning fluid 34 via the optional agitators 29 may be performed to lift and extract debris from the surface 11, with the spent cleaning fluid 34 and entrained debris being suctioned away through the suction nozzle 20, through the suction nozzle volume 10V, and into the airflow pathway 82. The recovered cleaning fluid 34 and debris can ultimately be directed to a recovery tank.

CLEAN OUT MODE: Referring to FIG. 6, when the user actuates the second actuator 500A of FIG. 4 or one of the other disclosed second actuators 50, 500, an applied actuation force is imparted to the diverter sleeve 66. This action causes the diverter sleeve 66 to translate over the spray tip 550 and move the diverter sleeve 66 from the spray position 83*a* to a clean out position 83*b*, or a closed position 83*b*, covering or blocking the spray tip 550. As a result, the cleaning fluid 34 is temporarily diverted from or around the spray tip 550 and travels down the length of the sprayer tube 64. The cleaning fluid 34 is diverted along an alternative route from the spray tip 550, through a diverter orifice 84 or a sprayer passage inlet 84 defined by the sprayer tube 64, and to a sprayer tube passage 85. This alternative route generally retains the cleaning fluid 34 in the accessory tool 10T.

Following the alternate route, the cleaning fluid 34 passes through the sprayer tube passage 85 and exits the second end 65B. From this exit point, the dispensed cleaning fluid 34 enters the rinse tip 68 and is directed through the downward fluid passage 69. The cleaning fluid 34 then enters the transverse fluid channels 62 (see FIGS. 4, 8, and 12), is drawn into the suction nozzle volume 10*y*, and is extracted through the airflow pathway 82 via the suction forces applied by the suction source 22. Accordingly, the cleaning fluid 34 flows along the length of the accessory tool 10T to be drawn through the suction nozzle volume 10*y*, drawing debris materials from the suction nozzle volume 10*y* to the airflow pathway 82 to clean out the suction nozzle volume 10*y*.

Figure 7:
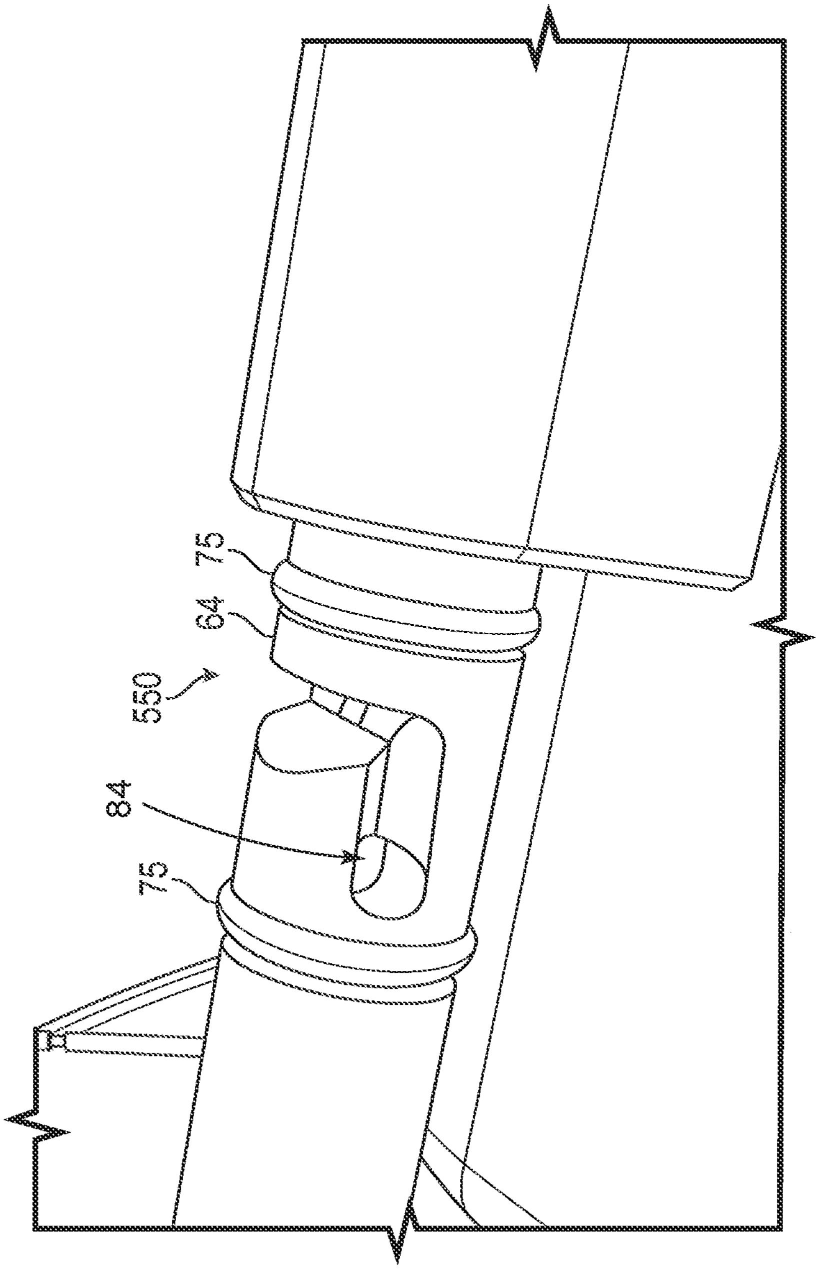
FIG. 7 is a partial side perspective view of a portion of a sprayer tube usable as part of an accessory tool, according to the present disclosure.

FIG. 7 illustrates a possible construction of the sprayer tube 64 in which the diverter sleeve 66 is arranged to selectively uncover the spray tip 550, which as shown may be flanked by O-rings 75 for proper fluidic sealing. When the diverter sleeve 66 is in the clean out position 83*b*, the diverter sleeve 66 covers the spray tip 550, limiting or preventing the cleaning fluid 34 from being dispensed onto the surface 11. The cleaning fluid 34 is diverted from the spray tip 550 to the sprayer passage inlet 84 and to the sprayer tube passage 85. The sprayer passage inlet 84 may be configured as a circular, square, or other shaped aperture extending from an outside surface of the sprayer tube 64 to the sprayer tube passage 85. The O-rings 75 provide a seal around the sprayer passage inlet 84 to force or direct the cleaning fluid 34 through the sprayer passage inlet 84, to the sprayer tube passages 85, and ultimately to the suction nozzle volume 10*y*.

Figure 8:
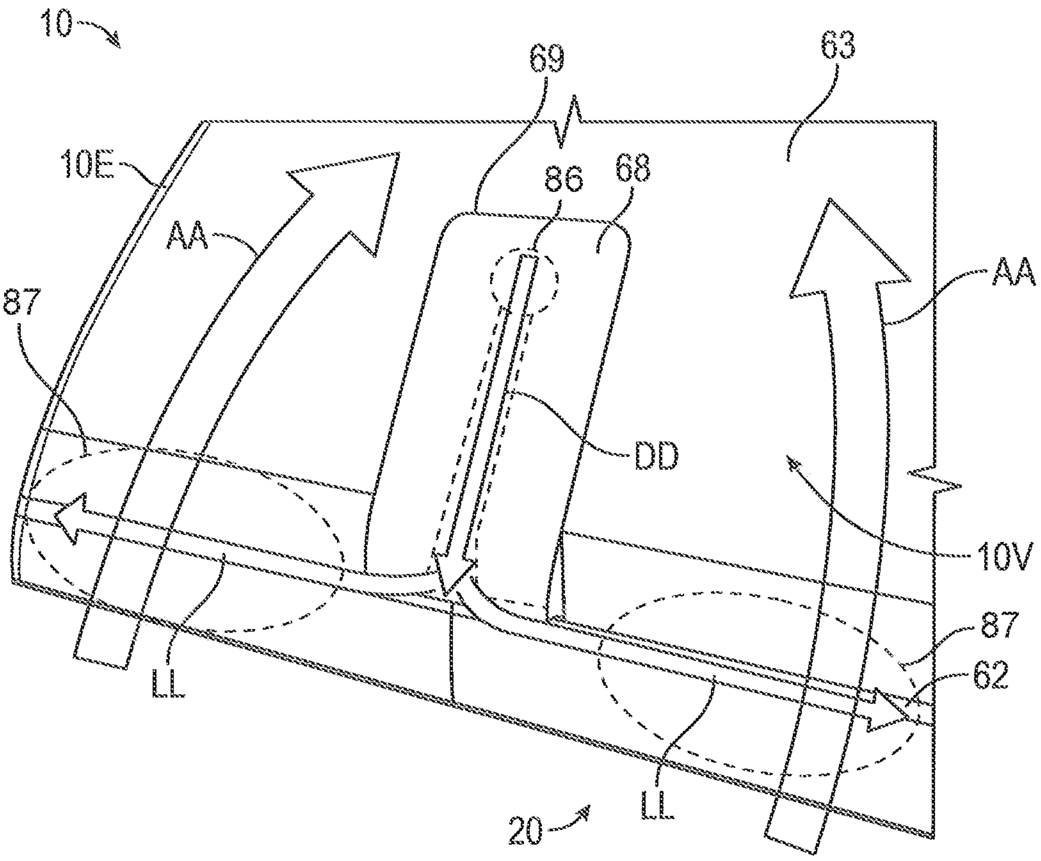
FIG. 8 is a partial front perspective view of a portion of a tool body of an accessory tool having a rinse tip attached thereto, according to the present disclosure.

Referring to FIG. 8, the inner surface of the lens 100 is flushed, along with the insides of the wand 46 and the length of the accessory hose 13 located downstream of the tool body 10 due to the dispensed cleaning fluid 34 circulating within and being drawn through the suction nozzle volume 10*y*, the wand 46, and the accessory hose 13, in particular. The provided operating mode is therefore described herein as being a "clean out" mode separate from the "spray" mode of FIG. 5. The rinse tip 68 is therefore configured to conduct the cleaning fluid 34 into the suction nozzle volume 10*y* during the "clean out" mode. Those skilled in the art will appreciate that other approaches could be taken to delivering the cleaning fluid 34 to the suction nozzle volume 10V within the scope of the disclosure (e.g., through one or more spray outlets formed in the rinse tip 68 or the rear tool wall 63) and therefore the representative constructions described herein as intended to illustrate a few possible implementations.

Referring still to FIG. 8, and as shown in FIGS. 5 and 6, the tool body 10 includes the rear tool wall 63. The rear tool wall 63, which serves as a rear wall of the tool body 10 when viewed by a user through the lens 100 of FIGS. 5 and 6, defines the transverse fluid channel 62. The transverse fluid channel 62 in turn is arranged parallel to and adjacent to the suction nozzle 20 to the suction nozzle volume 10V. During the "clean out" mode described above and depicted in FIG. 6, the cleaning fluid 34 exits the sprayer tube 64 and passes into the rinse tip 68 at a fluid junction 86 between the end 65B of the sprayer tube 64 and the rinse tip 68. For example, the fluid junction 86 may be a mating portion of the rinse tip 68 configured to receive the end 65B of the sprayer tube 64, as shown in FIG. 4.

From the fluid junction 86, the downward fluid passage 69 defined within the rinse tip 68 conducts the cleaning fluid 34 as a downward fluid stream (indicated by arrow DD) into the transverse fluid channel 62 situated below the fluid junction 86. As the cleaning fluid 34 enters the transverse fluid channel 62, the fluid stream (indicated by arrow DD) is divided and guided into and along the transverse fluid channel 62 in approximately equal volumes. The transverse fluid channel 62 may therefore be thought of as two transverse fluid channels 62 arranged end-to-end as shown. The transverse fluid channel 62 is configured such that opposing low-pressure zones 87 are created as the airflow (indicated by arrow AA) through the suction nozzle 20 passes over the transverse fluid channel 62. As a result, a divided fluid stream (indicated by arrow LL) of the cleaning fluid 34 contained in the transverse fluid channel 62 is pulled outward toward edges 10E of the tool body 10 and is eventually drawn upward and out through the airflow pathway 82 of FIGS. 5 and 6. This action has the desirable effect of rinsing or flushing the lens 100, the rear tool wall 63, and eventually the wand 46 and the accessory hose 13.

Figure 9:
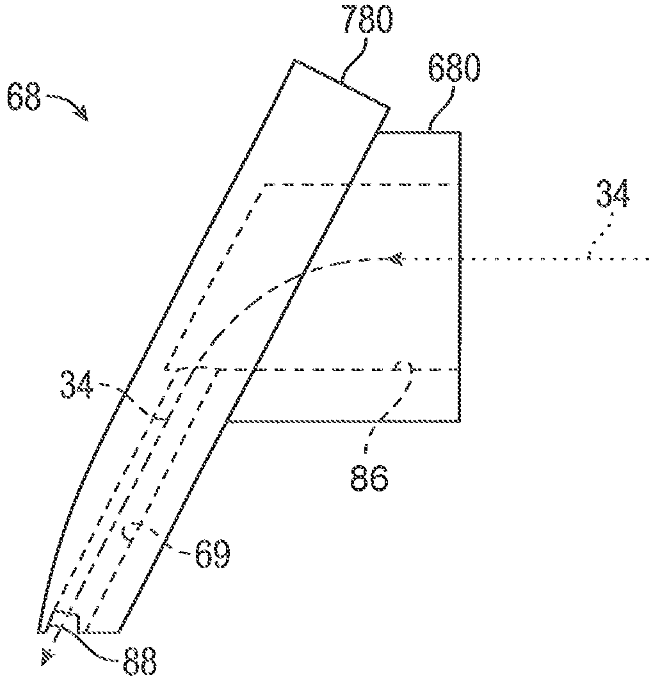
FIG. 9 is a side elevational view of a rinse tip usable as part of an accessory tool, according to the present disclosure.
Figure 10:
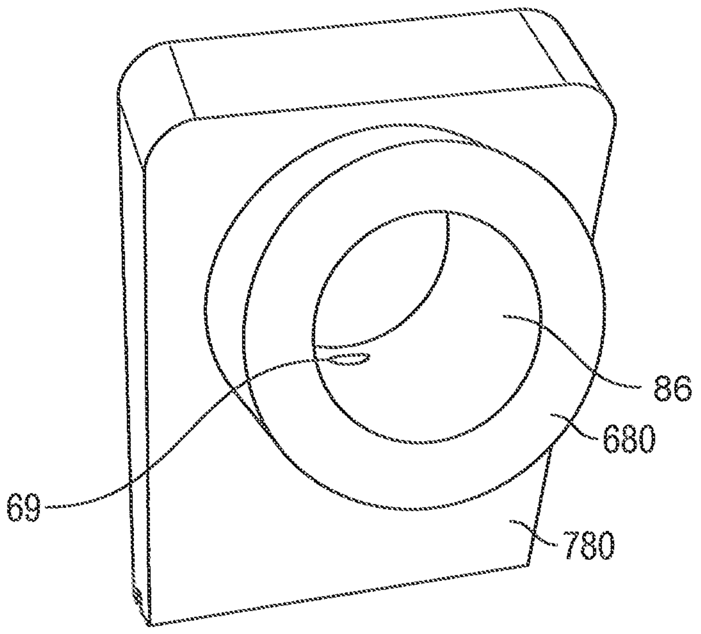
FIG. 10 is a side perspective view of the rinse tip shown in FIG. 9, according to the present disclosure.
Figure 11:
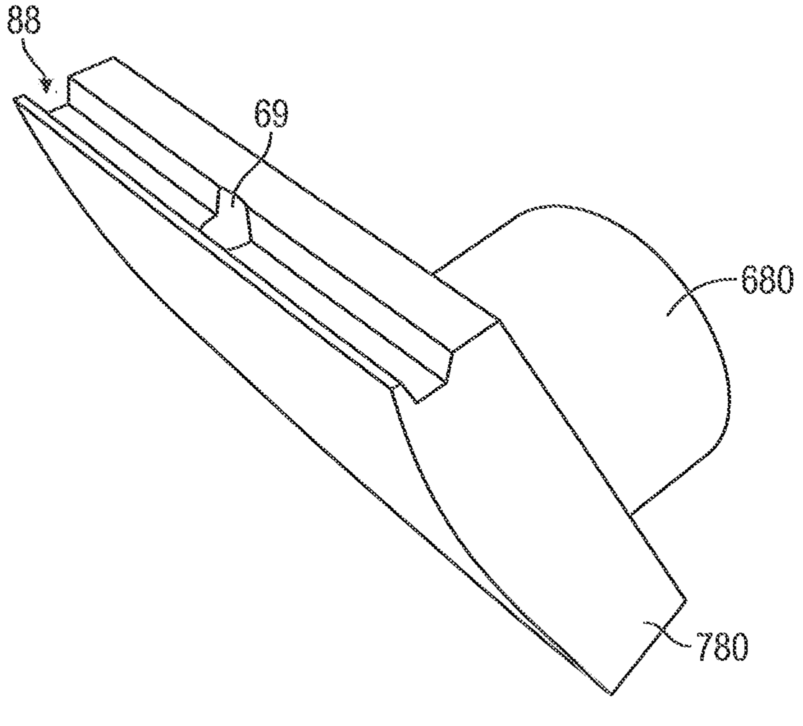
FIG. 11 is a side perspective view of the rinse tip shown in FIGS. 9 and 10, according to the present disclosure.

Referring now to FIGS. 9, 10, and 11, the rinse tip 68 may include an inlet tube 680, which may be a circular extension or flange defining therein the fluid junction 86, and a conduit body 780 that is coupled to or formed integrally with the inlet tube 680. Cleaning fluid 34 (FIG. 9) entering the fluid junction 86 ultimately flows into the fluid passage 69 and downward to an elongated fluid outlet 88, the latter of which is shown in FIGS. 9 and 11. Exiting cleaning fluid 34 thereafter spills from the fluid passage 69 into the transverse fluid channel 62.

Figure 12:
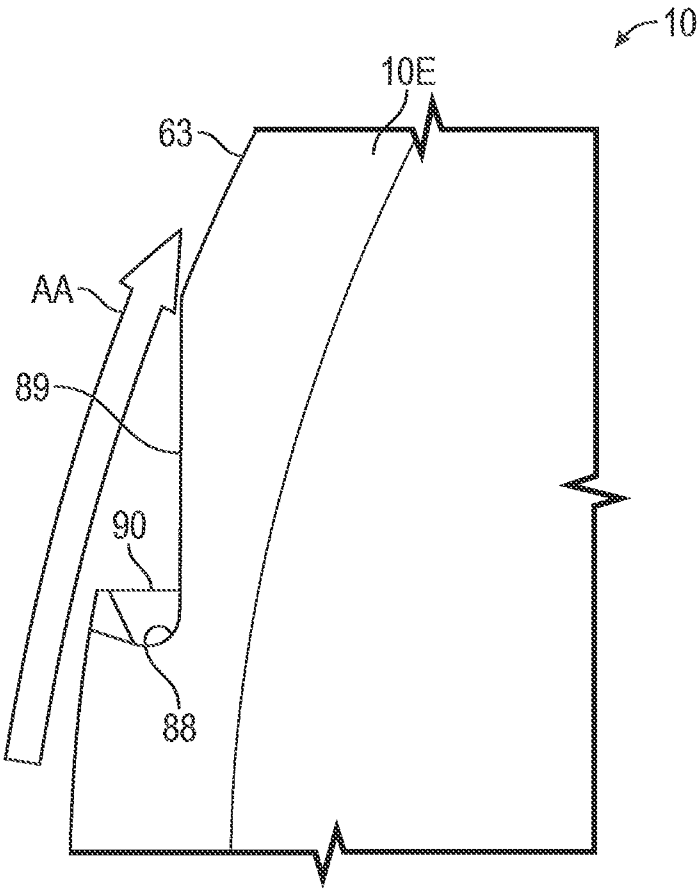
FIG. 12 is a partial side perspective view of an end of a fluid conduit of a tool body, according to the present disclosure.

FIG. 12 depicts a possible geometry of the transverse fluid channel 62 suitable for creating the low-pressure zones 87 of FIG. 8, in this case as depressions in the airflow (arrow AA) of the suction nozzle volume 10*y*, the latter of which is shown in FIGS. 5 and 6. The transverse fluid channel 62 may include a radiused channel portion 88 and a forward-sloping sloped wall 89 that is contiguous with the radiused channel portion 88. The sloped wall 89 meets with the rear tool wall 63 of the tool body 10, as is likewise shown in FIG. 8. Therefore, the airflow (indicated by arrow AA) passes from the suction nozzle 20 of FIGS. 5-6, upward over an elongated lip 90 disposed forward of the radiused channel portion 88, and along the rear tool wall 63 of the tool body 10, thereby drawing out and distributing cleaning fluid 34 from within the transverse fluid channel 62. While other geometries may be used within the scope of the disclosure, the particular geometry of FIG. 12 has the benefit of creating a trough along the rear tool wall 63 that allows accumulated fluid to be dispersed toward the edges 10E before being extracted via the airflow (arrow AA), thus creating a dispersed flow field useful for cleaning the lens 100 and rear tool wall 63 of FIGS. 5 and 6.

Referring to FIGS. 13-22, an alternative configuration of an accessory tool 110T is illustrated that is substantially similar to the configurations illustrated in FIGS. 2-12, with differences being seen primarily in a transverse fluid channel 162, a rinse tip 168, and an airflow pathway 182, among others, as described herein. In the description of the accessory tool 110T, where possible, reference numerals were used that were additive by multiples of one hundred of reference numerals of other discussed configurations to discuss similar or like components (e.g., the rear tool wall 63 in FIGS. 2-22 and a rear tool wall 163 in FIGS. 13-22) with similar or identical structures and/or functionalities.

Figure 13:
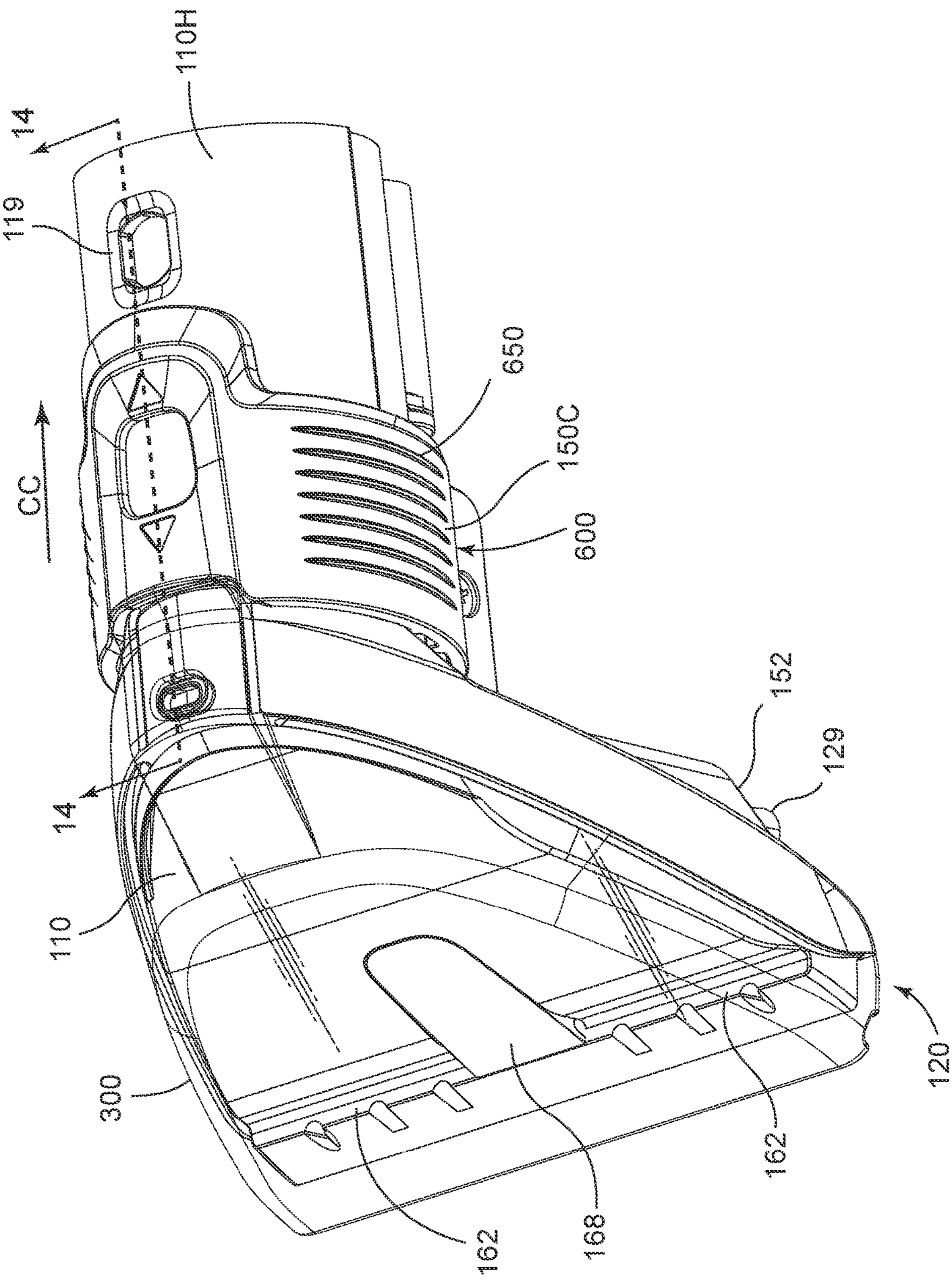
FIG. 13 is a side perspective view of an alternative configuration of an accessory tool, according to the present disclosure.
Figure 14:
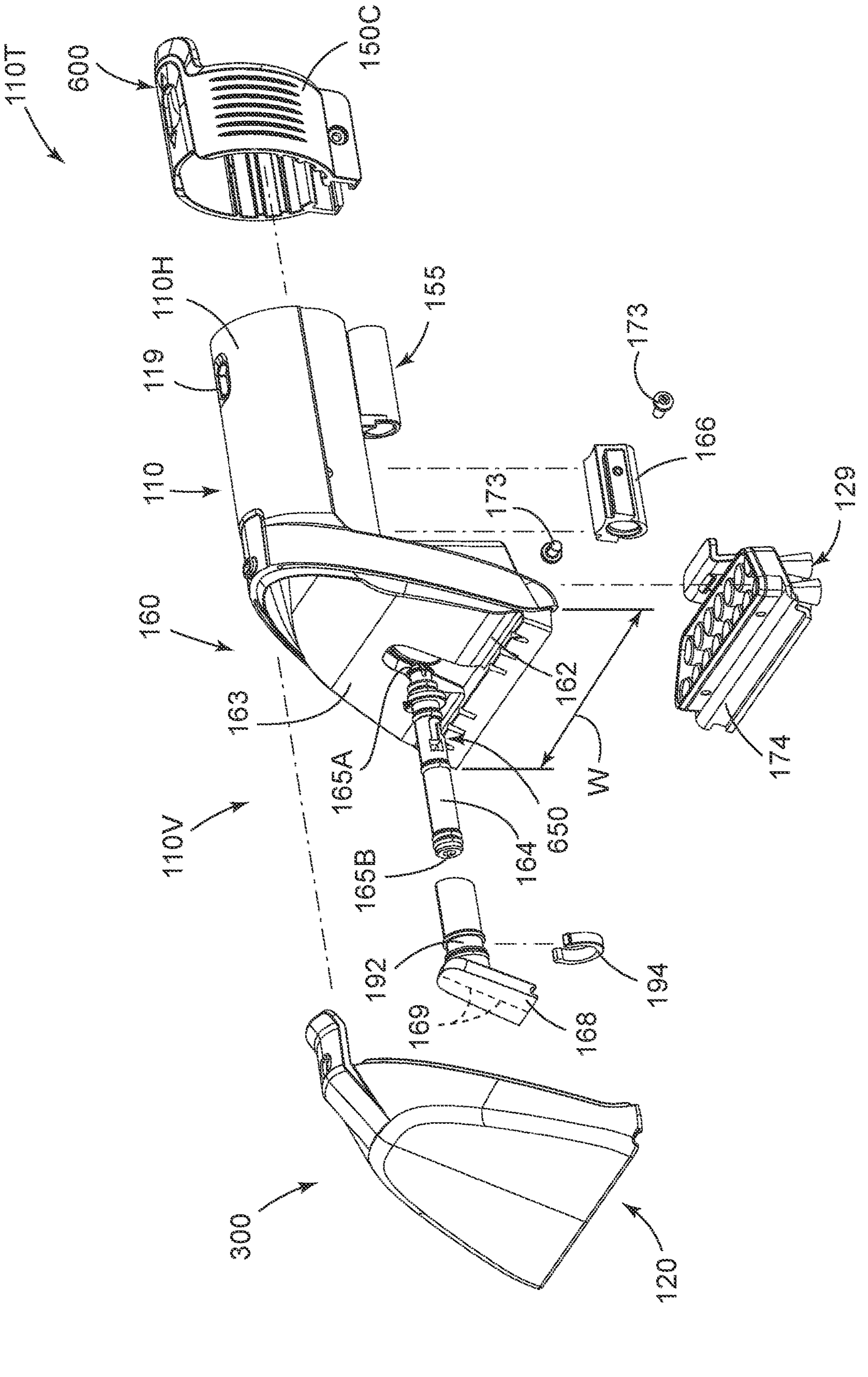
FIG. 14 is an exploded side perspective view of an alternative configuration of an accessory tool, according to the present disclosure.

Referring to FIGS. 13 and 14, the accessory tool 110T includes a lens 300 that is selectively coupled to a tool body 110 and defines a suction nozzle volume 110V therebetween, a spray nozzle 155 having a spray tip 650, and a cleanout assembly 160. The accessory tool 110T may also include agitators 129 coupled to the tool body 110 with a brush plate 174. The tool body 110 defines a tubular handle 110H that is connectable to the fluid delivery system 30 and the fluid recovery system 18 via the wand 46 (FIG. 2) and the accessory hose 13 (FIG. 1) as noted above. The tubular handle 110H includes a latch feature 119 to couple the accessory tool 110T to the wand 46. The tool body 110 includes the rear tool wall 163 opposing the lens 300 and at least partially defines the transverse fluid channel 162. The transverse fluid channel 162 extends parallel to and adjacent to a suction nozzle 120 of the tool 110T forming a nozzle opening to the suction volume 110V.

The cleanout assembly 160 includes a sprayer tube 164 having the spray tip 650, a rinse tip 168, and a diverter sleeve 166. The diverter sleeve 166 is configured to selectively cover and uncover the spray tip 650 of the sprayer tube 164. The diverter sleeve 166 is coupled to a second actuator 600, which is a sliding collar 150C that may be translated along the handle 110H. In the illustrated configuration, the sliding collar 150C is translated away from the lens 300 (in a direction indicated by arrow CC) to create a bypass and block the spray tip 650 with the diverter sleeve 166 and is translated towards the lens 300 (opposite the direction of arrow CC) to unblock or open the spray tip 650. As illustrated, the sliding collar 150C is connected to the diverter sleeve 166 using a fastener 173, such as a screw or clip, and is not biased in either direction.

Figure 15:
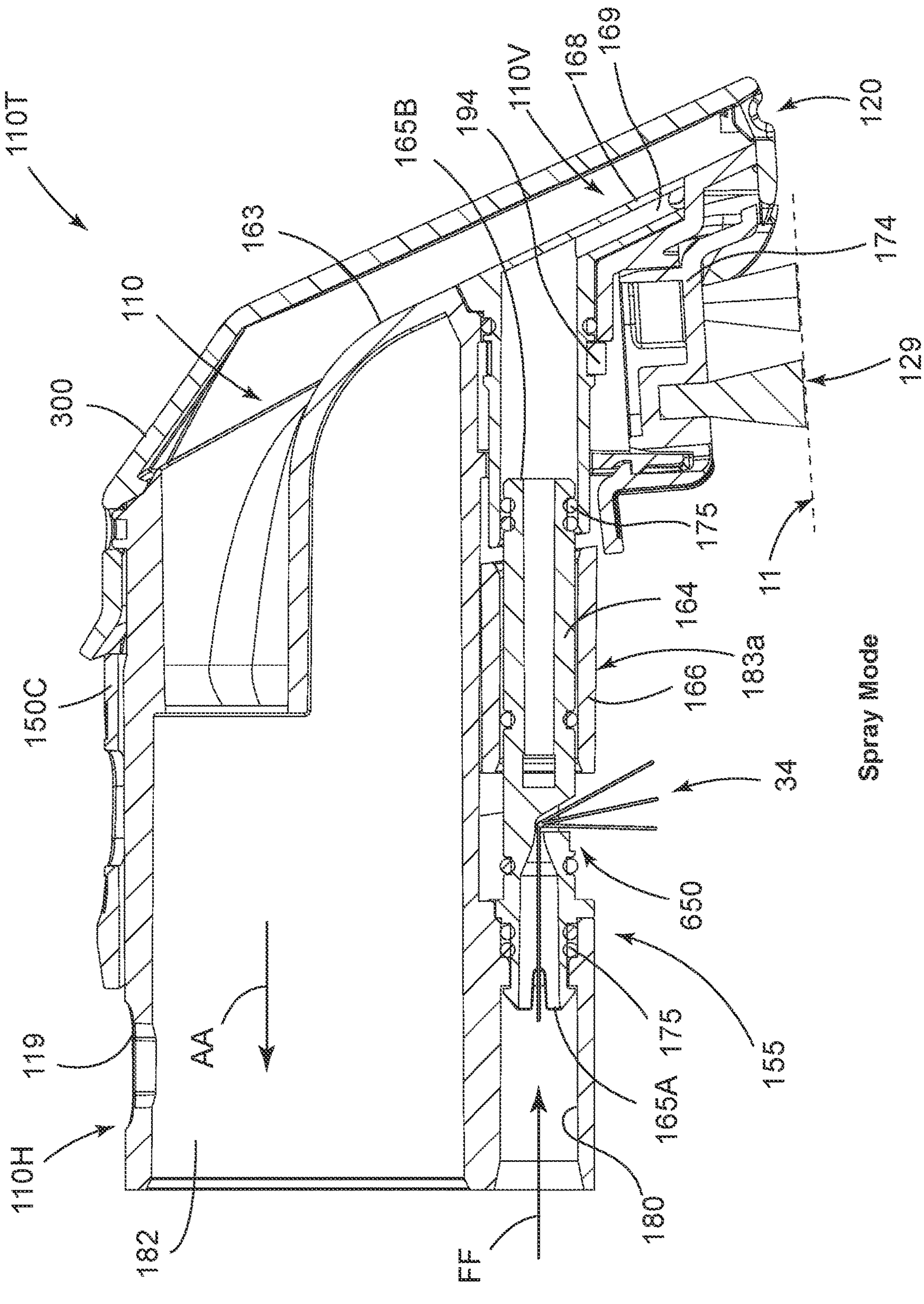
FIG. 15 is a side cross-sectional view of the accessory tool of FIG. 13 along lines 14-14 depicting a "spray" mode, according to the present disclosure.
Figure 16:
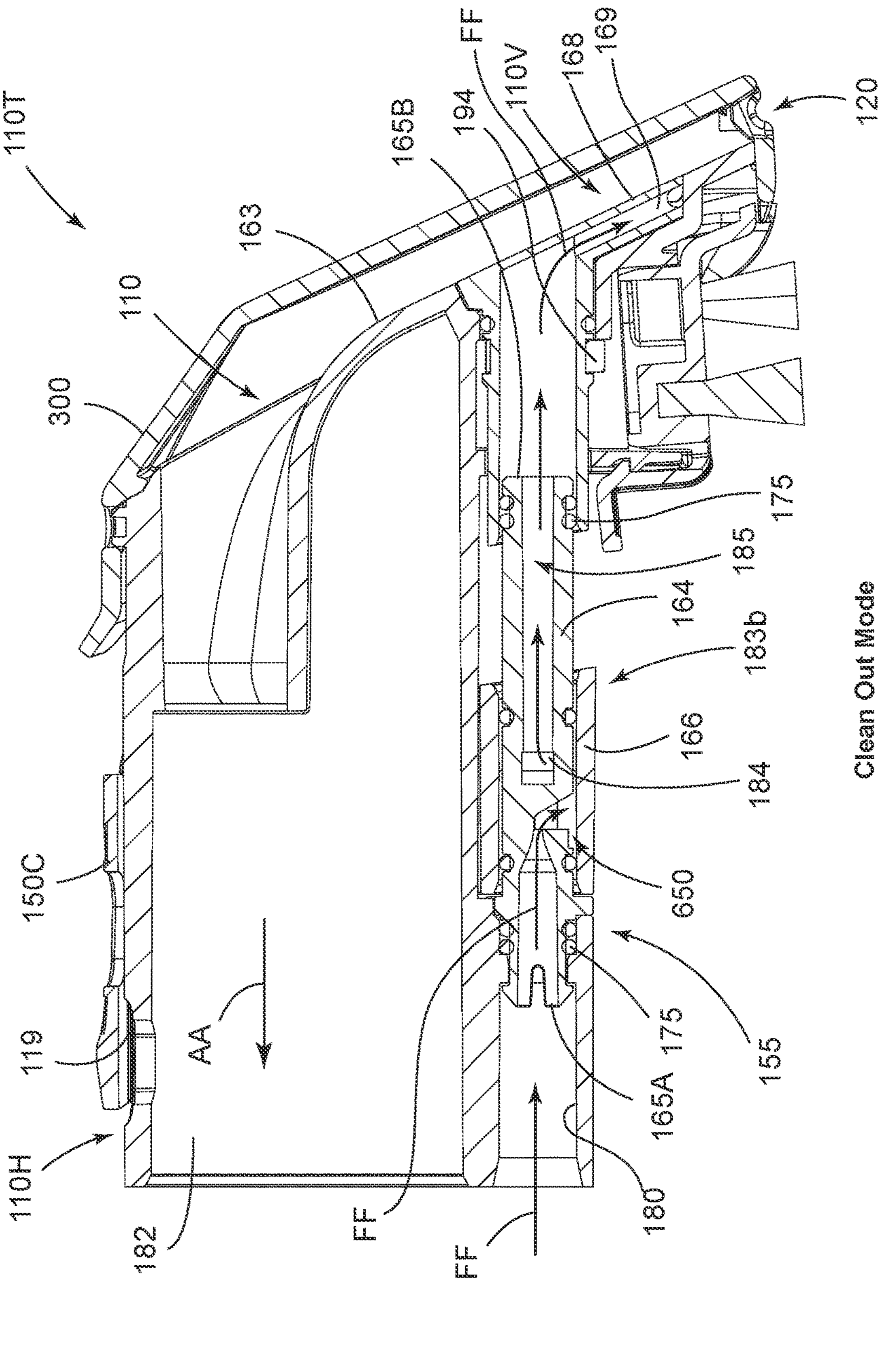
FIG. 16 is a side cross-sectional view of the accessory tool of FIG. 13 along lines 14-14 depicting a "clean out" mode, according to the present disclosure.

FIGS. 15 and 16 are cross-sectional views of the accessory tool 110T taken along cut line 14-14 of FIG. 13. As shown, the tool body 110 and the handle 110H contain or define a fluid delivery pathway 180 and the airflow pathway 182. The fluid delivery pathway 180 is configured to connect to the fluid delivery system 30 via the wand 46 and accessory hose 13, while the airflow pathway 182 is configured to connect to the fluid recovery system 18, likewise via the wand 46 and the accessory hose 13. Thus, the fluid delivery pathway 80 carries the cleaning fluid 34 (arrow FF) and the airflow pathway 82 carries the airflow (arrow AA). The spray tip 650 is in fluid communication with the fluid delivery pathway 180, with the cleaning fluid 34 ultimately passing through and out of the spray tip 650 or bypassing the spray tip 550 depending on the operating mode.

SPRAY MODE: In the "spray" mode performed by the configuration of the accessory tool 110T of FIG. 15, a user depresses or otherwise activates the first actuator 48, and the cleaning fluid 34 travels through a fluid delivery pathway 180 into a first end 165A of the sprayer tube 164, an outer diameter of which may be fluidly sealed via multiple O-rings 175 or seals. The cleaning fluid 34 exits a spray tip 650 and is dispensed onto the surface 11. The diverter sleeve 166 is in a spray position 183*a*, or an open position 183*a*, that allows the cleaning fluid 34 to exit a spray tip 650 and the accessory tool 110T. Agitation of the dispensed cleaning fluid 34 via the agitators 129 may be performed to lift and extract debris from the surface 11, with the spent cleaning fluid 34 and entrained debris being suctioned away through the suction nozzle 120, through the suction nozzle volume 10*y*, and into the airflow pathway 182. The recovered cleaning fluid 34 and debris can ultimately be directed to a recovery tank.

Figure 17:
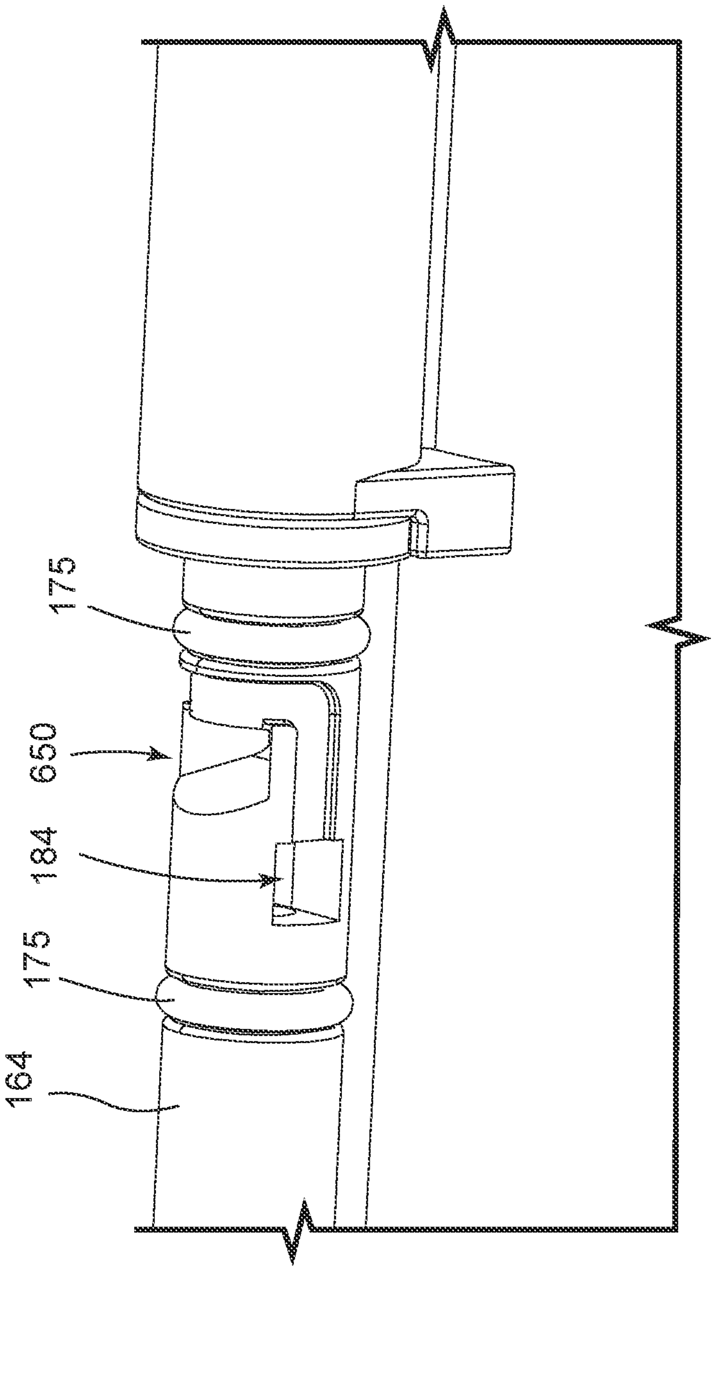
FIG. 17 is a partial side perspective view of a portion of a sprayer tube usable as part of an accessory tool, according to the present disclosure.

CLEAN OUT MODE: Referring to FIGS. 16 and 17, the diverter sleeve 166 may be translated over the spray tip 650 with the sliding collar 150C by a user to change the accessory tool 110T from the "spray" mode to the "clean out" mode. The spray tip 650 may be flanked by O-rings 175 to seal and limit or prevent the cleaning fluid 34 from being dispensed by the accessory tool 110T when in the "clean out" mode. The sliding collar 150*c* moves the diverter sleeve 166 from the spray position 183*a* to a clean out position 183*b*, or a closed position 183*b*, by covering or blocking the spray tip 560 from directing the cleaning fluid 34 to the surface 11. As a result, the cleaning fluid 34 is temporarily diverted from or around the spray tip 650 and travels down the length of the sprayer tube 164, remaining in the accessory tool 110T.

The cleaning fluid 34 is diverted along an alternative route from the spray tip 650, through a diverter orifice 184 or a sprayer passage inlet 184 defined by the sprayer tube 164, and to a sprayer tube passage 185. The alternative route generally retains the cleaning fluid 34 within the accessory tool 110T. Following the alternate route, the cleaning fluid 34 passes through a sprayer tube passage 185 and exits the second end 165B. From this exit point, the dispensed cleaning fluid 34 enters the rinse tip 168 and is directed through a downward fluid passage 169. The cleaning fluid 34 then enters transverse fluid channels 162 (see FIGS. 18 and 19), is drawn into the suction nozzle volume 110V, and is extracted through an airflow pathway 182 via the suction forces applied by the suction source 22. The inner surface of the lens 300 is flushed, along with the insides of the wand 46 and the length of the accessory hose 13 located downstream of the tool body 110 due to the dispensed cleaning fluid 34 circulating within the suction nozzle volume 110V, the wand 46, and the accessory hose 13, in particular.

Figure 18:
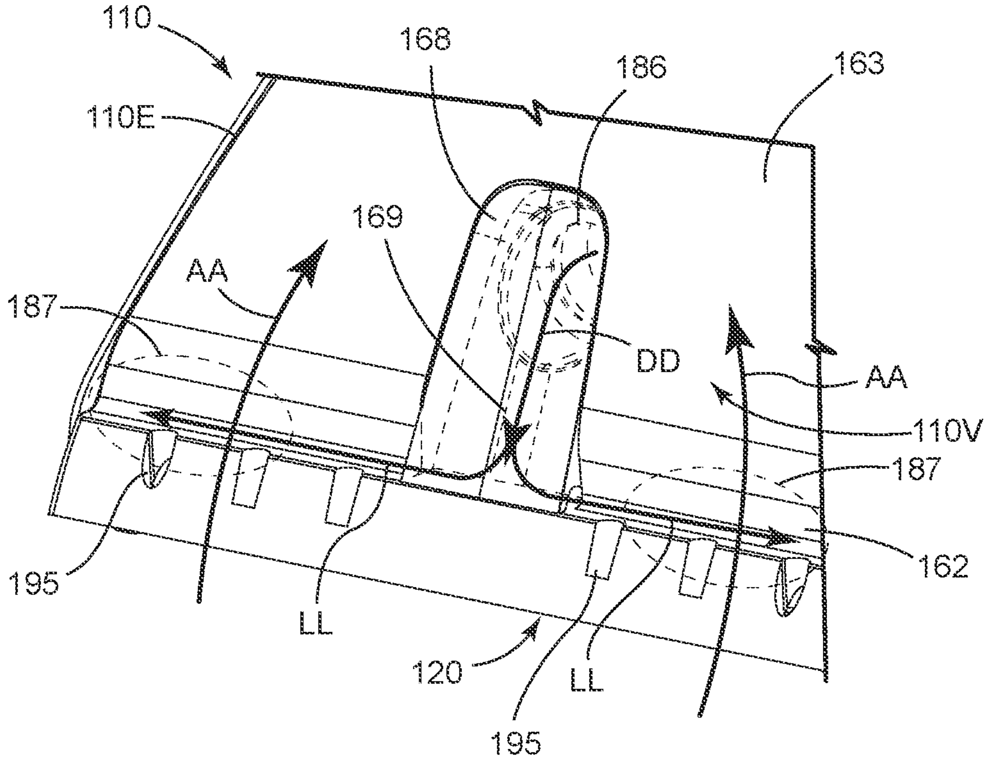
FIG. 18 is a partial front perspective view of a portion of a tool body having a rinse tip attached thereto, according to the present disclosure.

Referring to FIG. 18, the transverse fluid channel 162 is arranged parallel to and adjacent to the suction nozzle 120 to the suction nozzle volume 110V. During the "clean out" mode described above and depicted in FIG. 16, the cleaning fluid 34 exits the sprayer tube 164 and passes into the rinse tip 168 at a fluid junction 186 between the end 165B of the sprayer tube 164 and the rinse tip 168. The fluid junction 186 is sealed by O-rings 175 around the outer diameter of the sprayer tube 164, which is received within the rinse tip 168. The downward fluid passage 169 defined within the rinse tip 168 conducts the cleaning fluid 34 as a downward fluid stream (arrow DD) into the transverse fluid channel 162.

As the cleaning fluid 34 enters the transverse fluid channel 162, the fluid stream (DD) is divided and guided into and along the transverse fluid channel 162 in approximately equal volumes. Low-pressure zones 187 are formed over the transverse fluid channel 162 as the airflow (arrow AA) through the suction nozzle volume 110V passes over the transverse fluid channel 162. The rear wall 163 may define air guides 195 that are recessed or protruded relative to the rear wall 163 to guide the airflow and assist in forming the low-pressure zones 187. As a result, the divided fluid stream (arrow LL) of the cleaning fluid 34 contained in the transverse fluid channel 162 is pulled outward toward edges 110E of the tool body 110 and is eventually drawn upward and out through the airflow pathway 182 of FIGS. 15 and 16.

Figure 19:
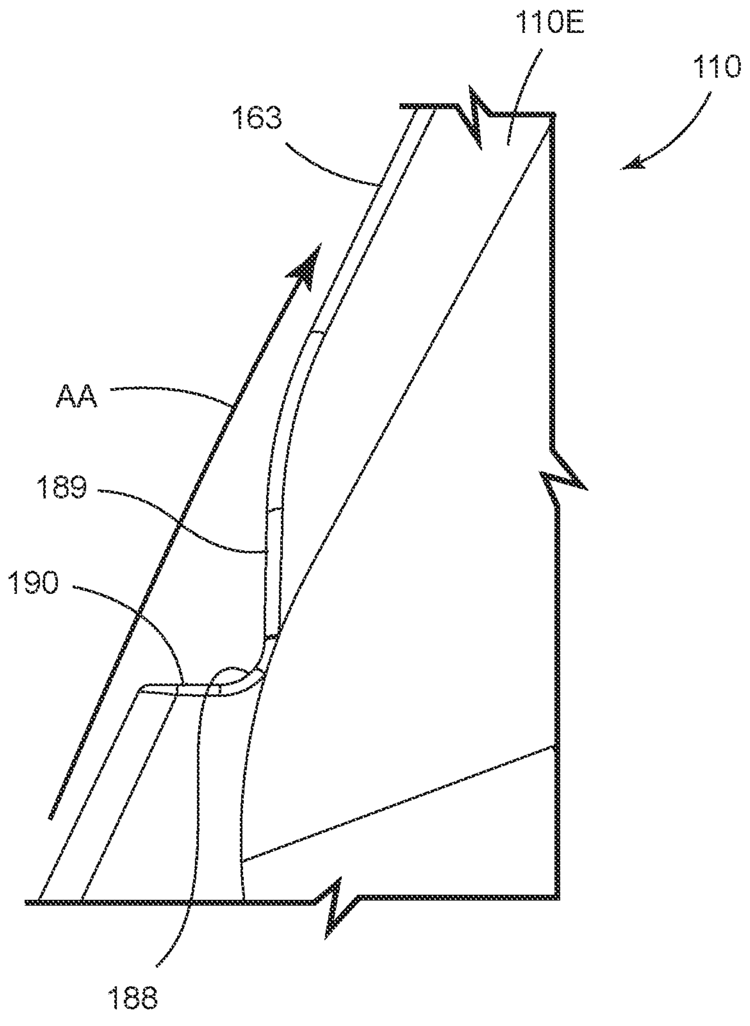
FIG. 19 is a partial side perspective view of an end of a fluid conduit of a tool body, according to the present disclosure.

Referring to FIG. 19, a side view of the transverse fluid channel 162 suitable for creating the low-pressure zones 187 is illustrated. The transverse fluid channel 162 includes a radiused channel portion 188 and a substantially vertical wall 189 that is contiguous with the radiused channel portion 188. The vertical wall 189 meets with the rear tool wall 163 of the tool body 110, as is likewise shown in FIG. 18. Therefore, the airflow (arrow AA) passes from the suction nozzle 120 of FIGS. 15 and 16, upward over a horizontal, lower surface 190 disposed forward of the radiused channel portion 188, and along the rear tool wall 163 of the tool body 110, thereby drawing out and distributing cleaning fluid 34 from within the transverse fluid channel 162.

Figure 20:
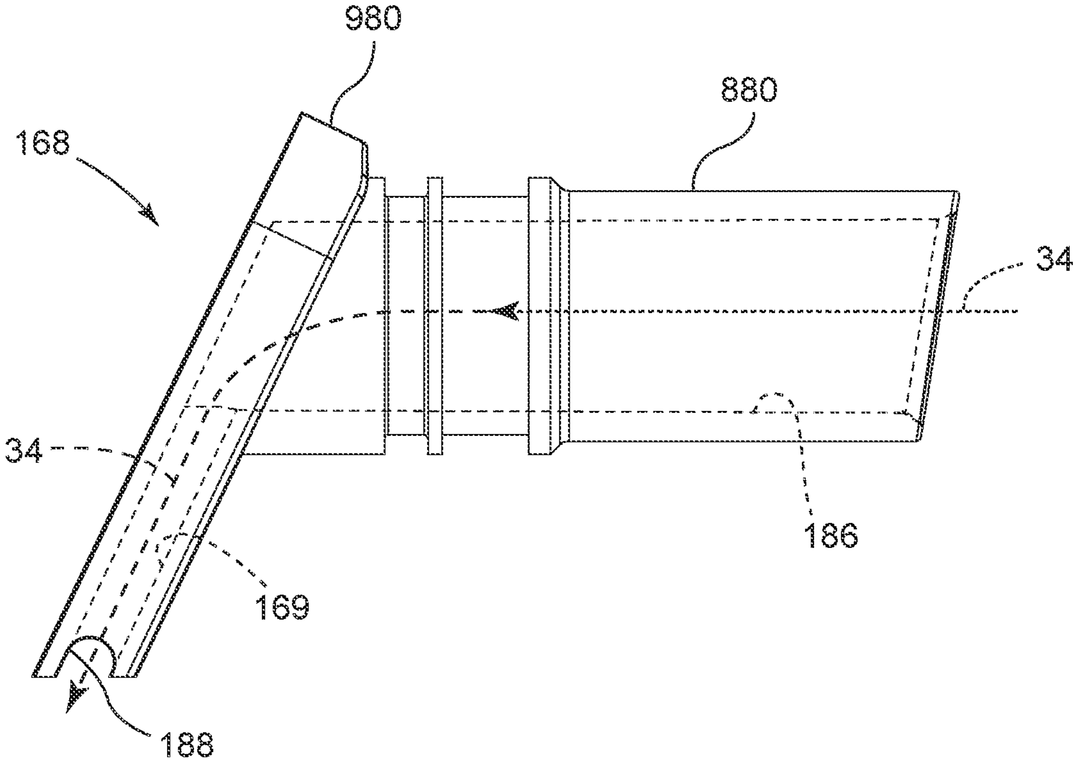
FIG. 20 is a side elevational view of a rinse tip usable as part of an accessory tool, according to the present disclosure.
Figure 21:
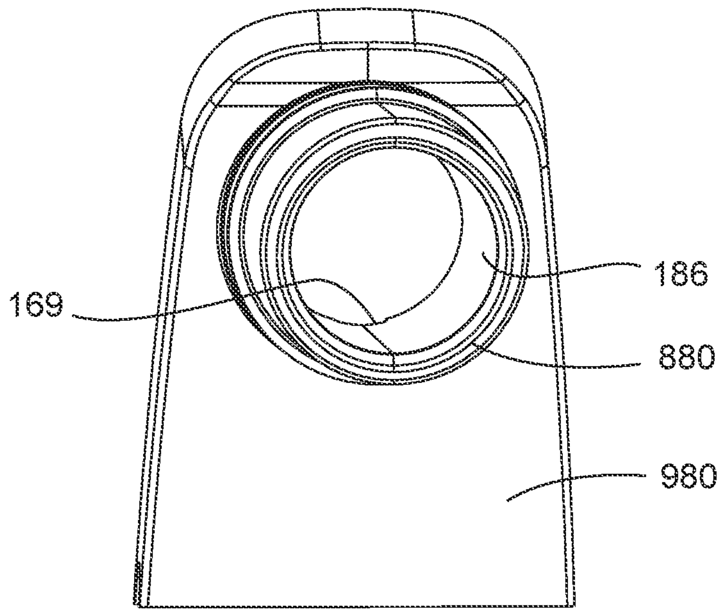
FIG. 21 is a side perspective view of the rinse tip shown in FIG. 20, according to the present disclosure.
Figure 22:
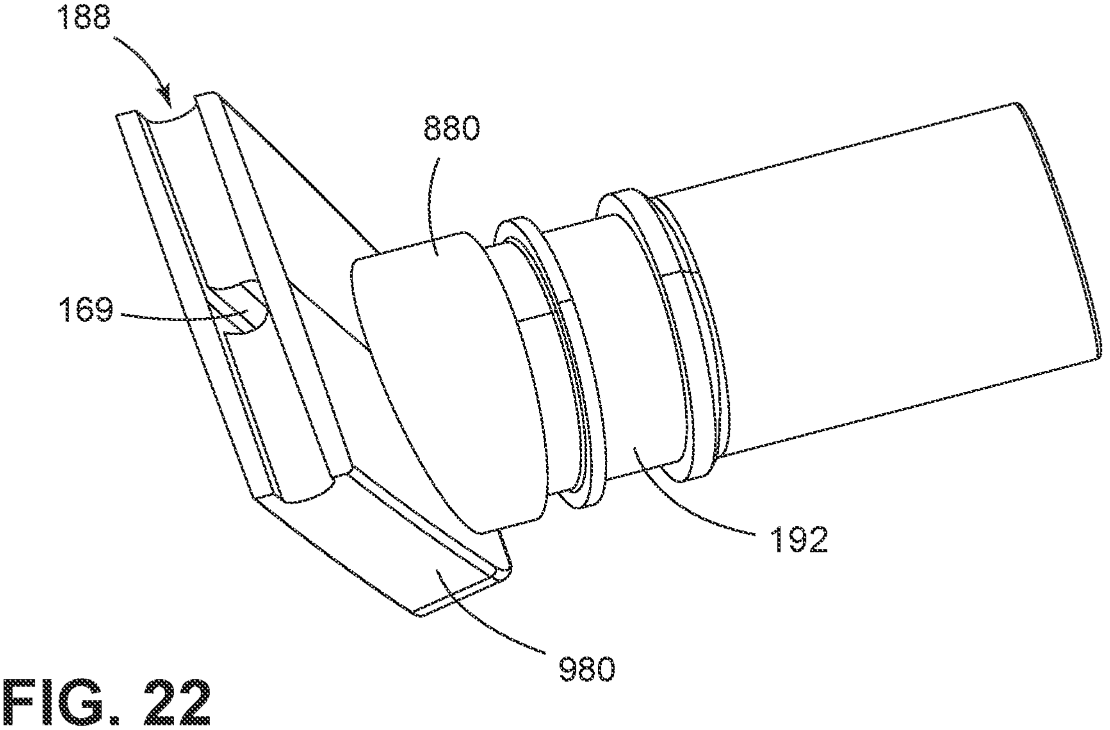
FIG. 22 is a side perspective view of the rinse tip shown in FIGS. 20 and 21, according to the present disclosure.

Referring to FIGS. 20, 21, and 22, the rinse tip 168 includes an inlet tube 880, which may be a circular extension or flange defining therein the fluid junction 186, and a conduit body 980 that is connected to or formed integrally with the inlet tube 880. Cleaning fluid 34 (FIG. 20) entering the fluid junction 186 ultimately flows into the fluid passage 169 and downward to an elongated fluid outlet 188, the latter of which is shown in FIG. 22. Exiting cleaning fluid 34 thereafter spills from the fluid passage 169 into the transverse fluid channel 162, where the cleaning fluid 34 generally pools to be guided by the airflow (arrow AA). The inlet tube 880 may define a slot 192 configured to couple to a clip 194 to retain the rinse tip 168 within the tool body 110 (see FIG. 14). The rinse tip 168 operates in a similar manner to that described herein and may direct the cleaning fluid 34 to the transverse fluid channel 162.

It will be understood by a person of ordinary skill in the art that similar or like components may be interchanged between configurations. It will be further understood by a person of ordinary skill in the art that similar or like components discussed may be modified, constructed, or changed in the same or similar manner to that previously discussed herein.

With reference to FIGS. 1-22, the accessory tools 10T, 110T described in detail herein therefore make the process of cleaning the accessory tool 10T, 110T, the wand 46, and the accessory hose 13 more efficient and user-friendly. In lieu of requiring a separate cleanout accessory, a user actuates the second actuator 50, 500, 500A, 600 to bypass the spray tip 550, 650 with the user thereafter actuating the first actuator 48 to dispense the cleaning fluid 34. Fluid entering the transverse fluid channel 62, 162 of FIGS. 8, 12, 18, and 19 is distributed horizontally to the suction nozzle 20, 120 and thereafter drawn into the air path (arrows AA) to provide the desired cleaning function. These and other attendant benefits will be readily appreciated by those skilled in the art in view of the foregoing disclosure.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

The following Clauses provide example configurations of an accessory tool and an extraction cleaner as disclosed herein.

Clause 1: An accessory tool for an extraction cleaner having an accessory hose, a fluid delivery system, and a fluid recovery system, the accessory tool comprising: a lens; a tool body connectable to said fluid delivery system and said fluid recovery system via said accessory hose, wherein the lens is coupled with the tool body to form a suction nozzle volume between the lens and a rear tool wall, and wherein the rear tool wall at least partially defines a fluid channel opposite the lens and in fluid communication with the suction nozzle volume; a spray tip configured to dispense a cleaning fluid from said fluid delivery system onto a surface during a spray mode of said extraction cleaner; and a cleanout assembly coupled to the tool body and configured to selectively divert the cleaning fluid from the spray tip and into the fluid channel during a clean out mode of said extraction cleaner to thereby clean the lens and the accessory hose.

Clause 2: The accessory hose of clause 1, wherein the rear tool wall is positioned opposite the lens, and wherein the fluid channel is arranged parallel to and adjacent to a nozzle opening to the suction nozzle volume.

Clause 3: The accessory tool of clause 1 or 2, further comprising: a tool actuator operably coupled to the tool body, wherein a spray actuator of said wand is configured to dispense the cleaning fluid from said fluid delivery system to the spray tip during the spray mode, and wherein the second actuator is configured to selectively divert the cleaning fluid from the spray tip during the clean out mode.

Clause 4: The accessory tool of clause 3, wherein the cleanout assembly includes a diverter sleeve connected to the tool actuator and configured to translate over the spray tip in response to an actuating force imparted by the second actuator.

Clause 5: The accessory tool of clause 3 or 4, wherein the tool actuator includes a lever feature operably coupled to the tool body.

Clause 6: The accessory tool of any of clauses 1-5, wherein the cleanout assembly includes a rinse tip configured to conduct the cleaning fluid toward and into the fluid channel during the clean out mode.

Clause 7: The accessory tool of clause 6, wherein the rinse tip defines a fluid passage that intersects the fluid channel and directs the cleaning fluid into the fluid channel.

Clause 8: The accessory tool of any of clauses 1-7, wherein the fluid channel is configured to create low-pressure zones adjacent to the suction nozzle volume to thereby distribute the cleaning fluid across a width of the tool body when a suction force is applied to the suction nozzle volume.

Clause 9: The accessory tool of clause 8, wherein the fluid channel includes one or more depressions in an airflow pathway of the suction nozzle volume.

Clause 10: The accessory tool of any of clauses 1-9, wherein the fluid channel includes a radiused channel portion and a sloped wall that is contiguous with the radiused channel portion.

Clause 11: An accessory tool for an extraction cleaner having an accessory hose with a wand including a spring actuator, a fluid delivery system, and a fluid recovery system, the accessory tool comprising: a lens; a tool body connectable to said fluid delivery system and said fluid recovery system via the accessory hose, wherein the lens couples to the tool body forming a suction nozzle volume therebetween; a spray tip configured to dispense a cleaning fluid from said fluid delivery system; a cleanout assembly configured to selectively divert the cleaning fluid from the spray tip and into the suction nozzle volume to thereby clean the lens and the accessory hose, wherein the cleanout assembly includes: a diverter sleeve slidable between a spray position and a clean out position, wherein the cleaning fluid is dispensed from the spray tip to a surface when the diverter sleeve is in the spray position, and wherein the cleaning fluid is diverted from the spray tip into the suction nozzle volume when the diverter sleeve is in the clean out position; and a rinse tip, and wherein the rinse tip is configured to conduct the cleaning fluid into the suction nozzle volume when the diverter sleeve is in the clean out position; and a tool actuator operably coupled to the tool body, wherein the tool actuator is operably coupled to the diverter sleeve and configured to move the diverter sleeve between the spray position and the clean out position.

Clause 12: The accessory tool of clause 11, wherein the tool actuator includes a slidable lever operably coupled to the tool body.

Clause 13: The accessory tool of clause 11 or 12, wherein the tool body includes a rear tool wall that at least partially defines a fluid channel, and wherein the rinse tip defines a fluid passage that intersects the fluid channel.

Clause 14: The accessory tool of clause 13, wherein the fluid channel is configured to create low-pressure zones adjacent to the suction nozzle volume to distribute the cleaning fluid across a width of the tool body when a suction force is applied to the suction nozzle volume.

Clause 15: The accessory tool of clause 14, wherein the fluid channel includes depressions in an airflow pathway of the suction nozzle volume.

Clause 16: The accessory tool of any of clauses 13-15, wherein the fluid channel includes a radiused channel portion and a sloped wall that is contiguous with the radiused channel portion.

Clause 17: An extraction cleaner comprising: an accessory hose; a fluid delivery system; a fluid recovery system; and an accessory tool comprising: a lens; a tool body connectable to the fluid delivery system and the fluid recovery system via the accessory hose, wherein the lens couples to the tool body to form a suction nozzle volume therebetween, the tool body comprises a rear wall that defines a transverse fluid channel, and wherein the transverse fluid channel is arranged parallel to and adjacent to a nozzle opening of the suction nozzle volume; a spray tip configured to dispense a cleaning fluid from the fluid delivery system onto a surface during a spray mode of said extraction cleaner; and a cleanout assembly configured to selectively divert the cleaning fluid from the spray tip and into the suction nozzle volume via the transverse fluid channel during a clean out mode of the extraction cleaner to thereby clean the lens and the accessory hose.

Clause 18: The extraction cleaner of clause 17, further comprising: a wand coupled to the accessory hose and including a first actuator; and a second actuator connected to the tool body, wherein the first actuator is configured to conduct the cleaning fluid from the fluid delivery system to the spray tip during the spray mode, wherein the second actuator is configured to selectively divert the cleaning fluid from the spray tip during the clean out mode, and wherein the cleanout assembly includes a diverter sleeve connected to the second actuator that is configured to translate over the spray tip in response to an actuating force from the second actuator.

Clause 19: The accessory tool of clause 17 or 18, wherein the cleanout assembly includes a rinse tip configured to conduct the cleaning fluid toward and into the transverse fluid channel during the clean out mode, and wherein the rinse tip defines a fluid passage that intersects the transverse fluid channel.

Clause 20: The extraction cleaner of any of clauses 17-19, wherein the transverse fluid channel is configured to create low-pressure zones adjacent to the suction nozzle volume to distribute the cleaning fluid across a width of the tool body when a suction force is applied to the suction nozzle volume, and wherein the transverse fluid channel includes a radiused channel portion and a sloped wall that is contiguous with the radiused channel portion.

While some of the best modes have been described in detail, various alternative designs may exist for practicing the present teachings defined in the appended claims. Those skilled in the art will recognize that modifications may be made to the disclosed embodiments without departing from the scope of the subject disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. An accessory tool for an extraction cleaner having an accessory hose with a wand, a fluid delivery system, and a fluid recovery system, the accessory tool comprising:

a lens;

a tool body connectable to said fluid delivery system and said fluid recovery system via said accessory hose, wherein the lens is coupled with the tool body to form a suction nozzle opening into a suction nozzle volume between the lens and a rear tool wall, and wherein the rear tool wall at least partially defines a transverse fluid channel opposite the lens, adjacent to the suction nozzle opening, and in fluid communication with the suction nozzle volume, wherein the transverse fluid channel includes a radiused channel portion and a wall contiguous with the radiused channel portion;

a spray tip configured to dispense a cleaning fluid from said fluid delivery system onto a surface during a spray mode of said extraction cleaner; and a cleanout assembly coupled to the tool body and configured to selectively divert the cleaning fluid from the spray tip and into the transverse fluid channel during a clean out mode of said extraction cleaner to thereby clean the lens and the accessory hose.

2. The accessory tool of claim 1, wherein the rear tool wall is positioned opposite the lens, and wherein the transverse fluid channel is arranged parallel to the suction nozzle opening to the suction nozzle volume.

3. The accessory tool of claim 1, further comprising:

a tool actuator operably coupled to the tool body, wherein a spray actuator of said wand is configured to dispense the cleaning fluid from said fluid delivery system to the spray tip during the spray mode, and wherein the tool actuator is configured to selectively divert the cleaning fluid from the spray tip during the clean out mode.

4. The accessory tool of claim 3, wherein the cleanout assembly includes a diverter sleeve connected to the tool actuator and configured to translate over the spray tip in response to an actuating force imparted by the tool actuator.

5. The accessory tool of claim 4, wherein the tool actuator includes a lever feature operably coupled to the tool body.

6. The accessory tool of claim 1, wherein the cleanout assembly includes a rinse tip configured to conduct the cleaning fluid toward and into the transverse fluid channel during the clean out mode.

7. The accessory tool of claim 6, wherein the rinse tip defines a fluid passage that intersects the transverse fluid channel and directs the cleaning fluid into the transverse fluid channel.

8. The accessory tool of claim 1, wherein the transverse fluid channel is configured to create low-pressure zones adjacent to the suction nozzle volume to thereby distribute the cleaning fluid across a width of the tool body when a suction force is applied to the suction nozzle volume.

9. The accessory tool of claim 8, wherein the transverse fluid channel includes one or more depressions in an airflow pathway of the suction nozzle volume.

10. An accessory tool for an extraction cleaner having an accessory hose with a wand including a spray actuator, a fluid delivery system, and a fluid recovery system, the accessory tool comprising:

a lens;

a tool body connectable to said fluid delivery system and said fluid recovery system via said accessory hose, wherein the lens couples to the tool body forming a suction nozzle volume therebetween;

a spray tip configured to dispense a cleaning fluid from said fluid delivery system in response to actuation of said spray actuator; a cleanout assembly configured to selectively divert the cleaning fluid from the spray tip and into the suction nozzle volume to thereby clean the lens and the accessory hose, wherein the cleanout assembly includes:

a diverter sleeve slidable between a spray position and a clean out position, wherein the cleaning fluid is dispensed from the spray tip to a surface when the diverter sleeve is in the spray position, and wherein the diverter sleeve is configured to translate over the spray tip to move the diverter sleeve to the clean out position, the cleaning fluid being diverted from the spray tip into the suction nozzle volume when the diverter sleeve is in the clean out position; and a rinse tip, wherein the rinse tip is configured to conduct the cleaning fluid into the suction nozzle volume when the diverter sleeve is in the clean out position; and a tool actuator operably coupled to the tool body, wherein the tool actuator is operably coupled to the diverter sleeve and configured to move the diverter sleeve between the spray position and the clean out position.

11. The accessory tool of claim 10, wherein the tool actuator includes a slidable lever operably coupled to the tool body.

12. The accessory tool of claim 10, wherein the tool body includes a rear tool wall that at least partially defines a fluid channel, and wherein the rinse tip defines a fluid passage that intersects the fluid channel.

13. The accessory tool of claim 12, wherein the fluid channel is configured to create low-pressure zones adjacent to the suction nozzle volume to distribute the cleaning fluid across a width of the tool body when a suction force is applied to the suction nozzle volume.

14. The accessory tool of claim 13, wherein the fluid channel includes depressions in an airflow pathway of the suction nozzle volume.

15. The accessory tool of claim 13, wherein the fluid channel includes a radiused channel portion and a sloped wall that is contiguous with the radiused channel portion.

16. An extraction cleaner, comprising:

an accessory hose;

a fluid delivery system;

a fluid recovery system; and an accessory tool comprising:

a lens;

a tool body connectable to the fluid delivery system and the fluid recovery system via the accessory hose, wherein the lens couples to the tool body to form a suction nozzle volume therebetween, the tool body comprises a rear tool wall that defines a transverse fluid channel recessed into the rear tool wall to define a channel portion contiguous with a wall that extends to the rear tool wall, and wherein the transverse fluid channel is arranged parallel to and adjacent to a nozzle opening of the suction nozzle volume;

a spray tip configured to dispense a cleaning fluid from the fluid delivery system onto a surface during a spray mode of said extraction cleaner; and a cleanout assembly configured to selectively divert the cleaning fluid from the spray tip, through a fluid junction in a rinse tip, along the transverse fluid channel, and into the suction nozzle volume during a clean out mode of said extraction cleaner to thereby clean the lens and the accessory hose.

17. The extraction cleaner of claim 16, further comprising:

a wand coupled to the accessory hose and including a first actuator; and a second actuator operably coupled to the tool body, wherein the first actuator is configured to conduct the cleaning fluid from the fluid delivery system to the spray tip during the spray mode, wherein the second actuator is configured to selectively divert the cleaning fluid from the spray tip during the clean out mode, and wherein the cleanout assembly includes a diverter sleeve connected to the second actuator that is configured to translate over the spray tip in response to an actuating force from the second actuator.

18. The extraction cleaner of claim 16, wherein the cleanout assembly includes the rinse tip with the fluid junction and a fluid passage configured to conduct the cleaning fluid toward and into the transverse fluid channel during the clean out mode, and wherein the rinse tip defines the fluid passage that intersects the transverse fluid channel.

19. The extraction cleaner of claim 16, wherein the transverse fluid channel is configured to create low-pressure zones adjacent to the suction nozzle volume to distribute the cleaning fluid across a width of the tool body when a suction force is applied to the suction nozzle volume, and wherein the radiused channel portion includes a radiused channel portion and the wall includes a sloped wall that is contiguous with the radiused channel portion.

* * * * *